(12) United States Patent
Ishihara et al.

(10) Patent No.: US 6,706,291 B1
(45) Date of Patent: Mar. 16, 2004

(54) POULTRY PRODUCIBILITY IMPROVER AND POULTRY PRODUCIBILITY IMPROVEMENT METHOD

(75) Inventors: Noriyuki Ishihara, Yokkaichi (JP); Tsutomu Okubo, Yokkaichi (JP); Seiji Shu, Yokkaichi (JP); Lekh Raj Juneja, Yokkaichi (JP)

(73) Assignee: Taiyo Kagaku Co., Ltd., Mie (JP)

( * ) Notice: Subject to any disclaimer, the term of this patent is extended or adjusted under 35 U.S.C. 154(b) by 0 days.

(21) Appl. No.: 09/831,267

(22) PCT Filed: Nov. 9, 1998

(86) PCT No.: PCT/JP98/05048

§ 371 (c)(1),
(2), (4) Date: Aug. 8, 2001

(87) PCT Pub. No.: WO00/27219

PCT Pub. Date: May 18, 2000

(51) Int. Cl.[7] .................. A61K 35/78; A61K 31/715
(52) U.S. Cl. ............... 424/729; 514/54; 536/123; 536/114; 435/101; 435/99; 119/6.8; 426/807
(58) Field of Search ............ 424/729; 514/54; 536/123, 114; 435/101, 99

(56) References Cited

U.S. PATENT DOCUMENTS 5,811,148 A * 9/1998 Chin et al. ................ 426/548

FOREIGN PATENT DOCUMENTS

| EP | 0557627 A1 | * | 9/1993 |
| JP | 5-192091 | * | 8/1993 |
| JP | A7236429 | | 9/1995 |
| JP | A7255386 | | 10/1995 |
| JP | 8-173055 | * | 7/1996 |
| JP | 8-266230 | * | 10/1996 |
| JP | 9-322716 | * | 12/1997 |

* cited by examiner

Primary Examiner—Francisco Prats
(74) Attorney, Agent, or Firm—Birch, Stewart, Kolasch & Birch, LLP

(57) ABSTRACT

To provide a producibility improver for poultry, comprising a polymannose having a molecular weight distribution in which a polymannose having the molecular weights ranging from $1.8 \times 10^3$ to $1.8 \times 10^5$ accounts for 70% or more; the producibility improver for poultry further comprising a polyphenol compound; the producibility improver for poultry further comprising a delipidated rice bran; and a method of improving producibility for laying hens or edible chicken, using any one of the producibility improvers. According to the present invention, the improvement of producibility for poultry can be made at low costs.

41 Claims, 1 Drawing Sheet

POULTRY PRODUCIBILITY IMPROVER AND POULTRY PRODUCIBILITY IMPROVEMENT METHOD

Figure 1:
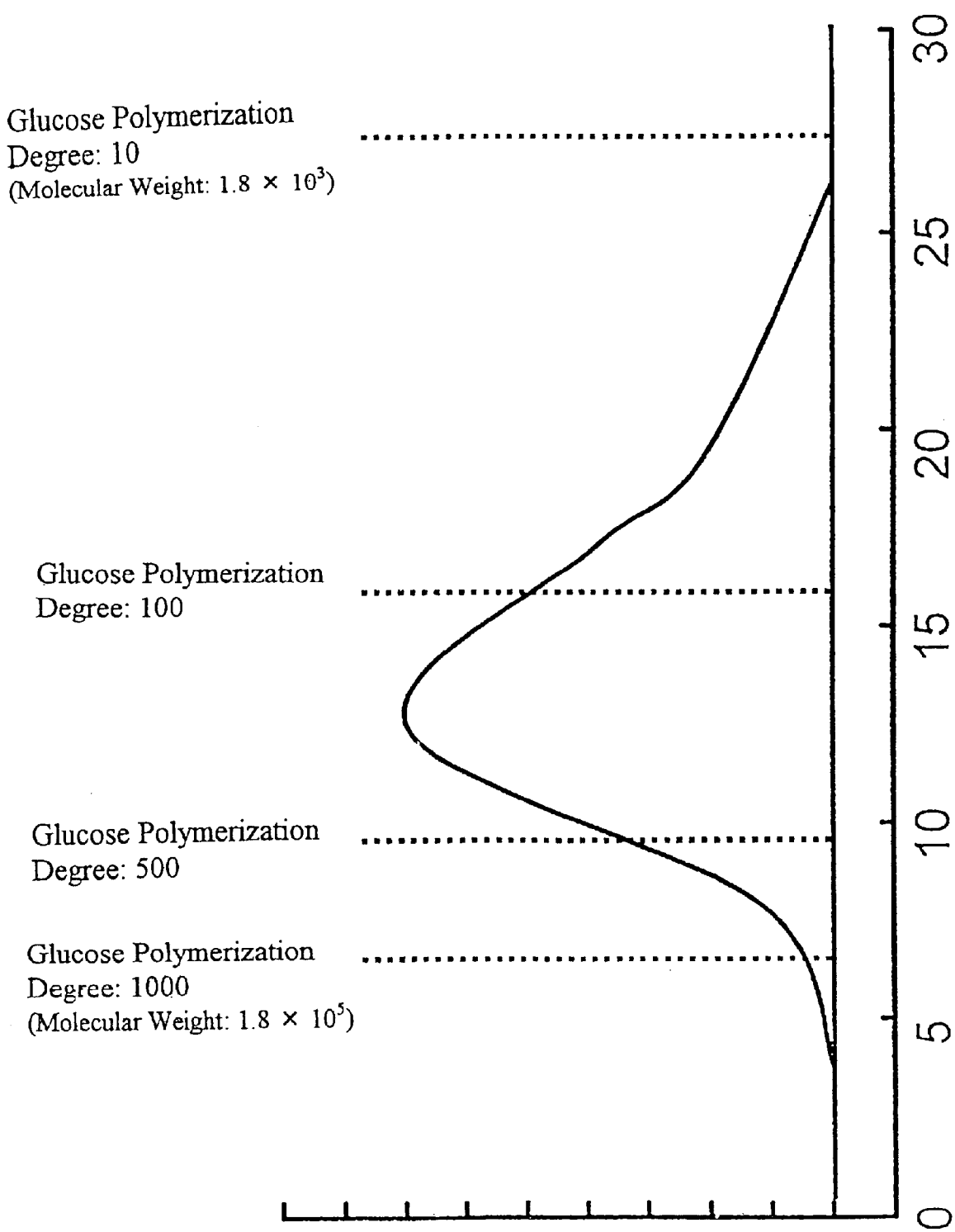

This application is the national phase under 35 U.S.C. §371 of PCT International Application No. PCT/JP98/05048 which has an International filing date of Nov. 9, 1998, which designated the United States of America.

TECHNICAL FIELD

The present invention relates-to a producibility improver for poultry and method of improving producibility for poultry.

BACKGROUND ART

To date, various means have been employed to improve producibility for poultry. For example, there has been known a method in which an antibiotic is in used as an animal growth improver; however, there arise such problems as the safety and economy of the eggs and chicken meat produced. In addition, there is known a technique concerning a method of giving a specified feed for laying hens in a specified time zone daily; however, it lacks practical applicability because enormous time and labor are required to meet the strict nutritional control of a feed and time management of a supplying feed.

Also, with regard to storage methods for retaining freshness and the like, there have been known some methods, including a method of storing chicken eggs under a given temperature range; a method of storing a rapidly frozen food under freezing in a package material of high capacity for gas barrier; a method of using a freshness-retaining package for edible chickens, the package comprising a particular package container; a method of preventing lowering of the freshness of shell eggs by using a carbon dioxide-generating agent; and a method of immersing a poultry product in a particular fermented seasoning. However, these methods are economically disadvantageous in that a storage equipment or implementation of an apparatus for preparing a package material is necessitated. Also, there arise other problems, including deterioration of the natural taste of poultry meat when immersed in a fermented seasoning.

In addition, regarding the production of chicken eggs containing a highly unsaturated fatty acid, Japanese Patent Laid-Open No. Hei 5-292853 discloses a method for producing poultry eggs containing a highly unsaturated fatty acid wherein poultry for egg collection are bred with subcutaneously inoculating a fat and oil containing a highly unsaturated fatty acid thereto; Japanese Patent Laid-Open No. Hei 7-227221 discloses a method of using a feed composition containing a specified fatty acid source; Japanese Patent Laid-Open No. Hei in 118-80164 discloses a method for producing edible bird eggs comprising allowing female birds to take linseeds, thereby allowing the female birds to lay eggs containing eicosapentaenoic acid or docosapentaenoic acid; and Japanese Patent No. 2558050 discloses a chicken feed wherein a powder containing eicosapentaenoic acid or docosapentaenoic acid is mixed with a feed to prevent decrease in a rate of egg production. Although these techniques concern methods for producing chicken eggs enriched with a hCghly unsaturated fatty acid, there arise problems in that the highly unsaturated fatty acid in chicken eggs during chicken egg storage is unstable because the highly unsaturated fatty acids tend to be oxidized at carbon-carbon double bonds, and have poor storage stability.

On the other hand, there have been known some techniques in which a degradation product of a polysaccharide is added to a mammalian or bird feed. Japanese Patent Laid-Open No. Hei 8-099884 reports that a degradation product of a polysaccharide, as well as in combination with tannin, has been effective in suppressing the growth of gram-negative bacteria. Japanese Patent Laid-Open No. Hei 6-329548 reports that an enzymatically degraded product of guar gum is added to a livestock feed, promoting bowel movement, thereby giving prophylactic and therapeutic effects on diarrhea and the like. In addition, Japanese Patent Laid-Open No. Hei 10-201428 discloses a mineral absorption-promoting feed composition containing galactomannan treated to have a lower molecular weight. However, none of these techniques are involved with improvement of the producibility of laying hens bred for the purpose of producing chicken eggs and the producibility of edible chickens bred for the purpose of producing chicken meat.

DISCLOSURE OF INVENTION

As a result of intensive studies, the present inventors have found that a polymannose having a specified molecular weight distribution, a composition comprising the polymannose and the polyphenol compound, or a compound firther comprising delipidated rice bran has an remarkable action of improving the producibility for poultry. The present invention has been perfected thereby.

Specifically, the present invention relates to:

(1) a producibility improver for poultry, comprising a polymannose having a molecular weight distribution in which a polymannose having the molecular weights ranging from $1.8 \times 10^3$ to $1.8 \times 10^5$ accounts for 70% or more;

(2) a producibility improver for poultry, comprising a polymannose having a molecular weight distribution in which a polymannose having the molecular weights ranging from $1.8 \times 10^3$ to $1.8 \times 10^5$ accounts for 70% or more, and a polyphenol compound;

(3) a producibility improver for poultry, comprising a polymannose having a molecular weight distribution in which a polymarnose having the molecular weights ranging from $1.8 \times 10^3$ to $1.8 \times 10^5$ accounts for 70% or more, a polyphenol compound, and a delipidated rice bran; and (4) a method of improving producibility for laying hens or edible chicken, using the producibility improver of any one of items (1) to (3) above.

BRIEF DESCRIPTON OF THE DRAWINGS

FIG. 1 is a graph showing one example where the molecular weight distribution of the polymannose is determined by using HPLC. This is an example of a polymannose having a molecular weight distribution in which a ipolymannose having the molecular weights ranging from $1.8 \times 10^3$ to $1.8 \times 10^5$ accounts for almost 100%.

BEST MODE FOR CARRYING OUT THE INVEON

1. Producibility Improver for Poultry

One of the great features of the producibility improver for poultry of the present invention resides in that the producibility improver comprises a polymannose having such a molecular weight distribution in which polymannose having the molecular weights ranging from $1.8 \times 10^3$ to $1.8 \times 10^5$ accounts for 70% or more. In the present invention, there is exhibited an excellent effectof a producibility-improving action for improving producibility for poultry easily, inexpensively and safely by formulating a producibility improver comprising the above-mentioned polymannose to a feed.

There are three embodiments of the producibility improver for poultry of the present invention: (1) a producibility improver comprising the above-mentioned polymannose (first embodiment); (2) a producibility improver further comprising a polyphenol compound in addition to the above-mentioned polymannose (second embodiment), and (3) a producibility improver further comprising delipidated rice bran in addition to the above-mentioned polymannose and polyphenol compound (third embodiment). Although a producibility-improving action is not found in the case where the polyphenol compound or the delipidated rice bran used in the present invention is each used alone, a producibility-improving action owned by the polymannose is surprisingly dramatically increased when used in combination with the above-mentioned polymannose. Therefore, the second or third embodiment is more preferred.

The term "poultry" as used in the present invention refers to chickens, home-bred chickens, silk fowls, turkeys, wild ducks, quails, ducks, guinea fowls, pheasants, crossbreed of wild and domestic ducks, geese, ostriches, and the like. The present invention is preferably applied to chickens, among which it is most preferably applied to laying hens bred for the purpose of producing chicken eggs, and to edible chickens bred for the purpose of producing chicken meat. There is no particular limitation as to the kinds of chickens.

In the present invention, the polymannose includes, for instance, substances obtained from polymerization of mannose; substances in which a saccharide, such as galactose, or an alcohol, such as ethyl alcohol, is bound via ether linkage with a part or all of hydroxyl groups of the substances obtained from polymerization of mannose; and substances in which carboxyl group, carboxymethyl group, phosphoric acid group, suiliric acid group, or the like is bound via ester linkage with a part or all of hydroxyl groups of the substances obtained from polymerization of mannose. Concretely, there may be exemplified mannan, locust bean gum, tara gum, and the like. Furthermore, those obtained by partially hydrolyzing the substances exemplified above or guar gum by using an enzyme, an acid, or the like may be used, and are encompassed within the scope of the polymannose of the present invention, as long as they have the molecular weight distribution falling within range mentioned above. In the present invention, the polymannose is preferably a polygalactomannan, and most preferably a polygalactomannan of which constituent ratio of galactose to mannose is 1 molecule of galactose to 2 molecules of mannose.

From the viewpoints of achieving of producibility improvement for poultry and preventing hygroscopicity, the above-mentioned polymannose is a polymannose having a molecular weight distribution in which a polymannose having the molecular weights ranging from $1.8 \times 10^3$ to $1.8 \times 10^5$ accounts for 70% or more, preferably polymannose having a molecular weight distribution accounting for 80% or more. A method for determining the molecular weight distribution comprises dissolving the polymannose in water, subjecting the solution to gel filtration through the TSKgel G6000PW column using the TOSO 803D high-performance liquid chromatograph (HPLC) with water as the mobile phase, and detecting by a differential refractometer. In this operation, by taldng measurements using straight-chain dextrins of known glucose numbers (degree of polymerization of glucose=10, 100, 500, 1000) as indicators, a graph for the molecular weight distribution as shown in FIG. 1 is obtained. A polymannose obtained by an actual preparation process is subjected to HPLC determination as described above, and the graph obtained is compared with that obtained using the indicative substances. The entire area of the molecular weight distribution and the area of a fraction corresponding to degrees of polymerization of glucose of 10 to 1,000 units are calculated, and the ratio (%) of the polymannose having the molecular weights ranging from $1.8 \times 10^3$ to $1.8 \times 10^5$ is calculated.

From the viewpoints of producibility improvement for poultry and hygroscopicity, the degree of polymerization of the above-mentioned polymannose is preferably 4 or more, more preferably 10 or more, and most preferably 30 or more. From the viewpoints of producibility improvement for poultry and decrease in the feed consumption, the degree of polymerization of the above-mentioned polymannose is preferably 190 or less, more preferably 100 or less, and most preferably 40 or less. Therefore, the above-mentioned polymannose preferably contains a large amount of polymannose units having a degree of polymerization of 30 to 40; concretely, those having a degree of polymerization of 30 to 40 are preferably 25% or more, and more preferably be 30% or more.

From the viewpoints of producibility improvement for poultry and reduction in the feed consumption, the viscosity of a 5% by weight aqueous solution of the above-mentioned polymannose at 5° C. is preferably 130 cps or less, more preferably 50 cps or less, and most preferably 20 cps or less, when the determination is carried out by using a Brookfield viscometer (type B viscometer).

In the above-mentioned polymannose, the dietary fiber content, as determined by the AOAC official method (*Official Methods of Analysis of AOAC INTERNATIONAL*, 16*th Edition*, Volume II, Chapter 32, p. 7), is preferably 60% by weight or more, more preferably 65% by weight or more, and most preferably 75% by weight or more.

When the above-mentioned polygalactomannan is used as the polymannose, an enzymatically degraded product of a substance selected from the group consisting of guar gum, locust bean gum and tara gum, for example, can be used. As a polymannose exhibiting the characteristics mentioned above, an enzymatically degraded product of guar gum obtained by enzymatically degrading guar gum is especially preferable.

The above-mentioned enzymatically degraded product can be obtained by enzymatically hydrolyzing the straight chain of mannose only, using β-galactomannanase derived from a fungus of the genus Aspergillus, the genus Rhizopus, or the like. As the above-mentioned enzymatically degraded product, the degradation product having a desired molecular weight can be obtained by changing the reaction time of the enzyme. The reaction conditions for enzymatic degradation are not particularly limited because the reaction conditions vary depending upon the desired molecular weight and the like. For example, in a case where β-galactomannanase derived from the genus Aspergillus is used, the reaction conditions include, conditions of a reaction pH of 2.0 to 3.5, a reaction temperature of 35° to 50° C., and a reaction time of 20 to 30 hours.

In the producibility improver of the present invention, as a second embodiment, the producibility for poultry can be further improved by further comprising a polyphenol compound in addition to the above-mentioned polymannose.

The above-mentioned polyphenol compound is preferably, but is not limited to, a polyphenol compound derived from a plant of the camellia family, cocoa, grape seeds, sweet potato or red wine. There may be used a plant as is, an extract from a plant, or an extract residue, or a chemically synthesized product. Extracts from a plant include hydrothermally extracted fractions, solvent-extracted fractions obtained by using an organic solvent, such as alcohol, ethyl acetate or a petroleum ether, steam-distilled fractions, compression fractions, fat and oil adsorption fractions, liquefied gas-extracted fractions, supercritically extracted fractions, or dry distilled fractions. From the viewpoint of the compositional ratio of the polyphenol compound, the polyphenol compound obtained from a hydrothermally extracted fraction of a plant of the camellia family is more preferred.

Among the plants of the camellia family, tea (*Camellia sinensis* L.) is preferable. Aiong them, the polyphenol compounds are preferably extracts of green tea, oolong tea or black tea, and extracts of green tea are especially preferable. The above-mentioned hydrothermally extracted fractions can be prepared, for instance, by a process described in Japanese Patent Laid-Open No. Hei8-103225.

Concrete examples of the above-mentioned polyphenol compounds include, for instance, (+)-catechin, (+)gallocatechin, (−)-gallocatechin gallate, (−)-epicatechin, (−)-epicatechin gallate, (−)-epigallocatechin, (−)-epigallocatechin gallate, free teaflavin, teaflavin monogallate A, teaflavin monogallate B, teaflavin digallate, and the like. The above-mentioned polyphenol compounds can be used alone or in admixture. Among the above-mentioned polyphenol compounds, at least one polyphenol compound selected from the group consisting of (−)-gallocatechin gallate, (−)-epicatechin gallate, and (−)-epigallocatechin gallate is preferable. Further, in the present invention, (−)-epigallocatechin gallate is preferable. The one which is isolated and purified is contained as a main component, and there may be used, for instance, an isolated and purified fraction thereof, or a synthesized product of (−)-epigallocatechin gallate. Here, the term "main component" refers to those which contain (−)-epigallocatechin gallate in an amount of 50% by weight or more.

When the above-mentioned polyphenol compounds are used in admixture, it is preferable that the contents of each polyphenol compound in the polyphenol compound mixture are: (+)-catechin 0.2 to 6.5% by weight, (+)-gallocatechin 2.0 to 18.0% by weight, (−)gallocatechin gallate 1.0 to 15.0% by weight, (−)epicatechin 0.5 to 10.0% by weight, (−)-epicatechin gallate 0.3 to 8.0% by weight, (−)-epigallocatechin 2.0 to 18.0% by weight, (−)-epigallocatechin gallate 3.0 to 21.0% by weight, free teaflavin 0 to 20.0% by weight, teaflavin monogallate A 0 to 5.0% by weight, teaflavin monogallate B 0 to 5.0% by weight, teaflavin digallate 0 to 5.0% by weight.

In this embodiment, the formulation ratio (weight ratio) of the polymannose and the polyphenol compound, as expressed by polymannose/polyphenol compound, is preferably 10/1 to 1/10, more preferably 5/1 to 1/5, and most preferably 2/1 to 1/2. The formulation ratio is the same in a case where the polyphenol compound (−)-epigallocatechin gallate is used as the main component.

In the present invention, as a third embodiment, producibility for poultry can be flrther dramatically improved by further comprising delipidated rice bran, in addition to the polymannose and polyphenol compound.

The delipidated rice bran refers to a product obtained by drying a product obtained by collecting oil from rice bran resulting from polishing brown rice. Also, the ingredient specification therefor includes, for example, those which are a water content 14.0% or less, a crude protein content 16.5% or more, a crude fiber content 9.5% or less, and a crude ash content 12.0% or less.

In this embodiment, the formulation ratios of the polymannose, the polyphenol compound and the delipidated rice bran are preferably 3.0 to 13.0 parts by weight of the polymannose, 0.3 to 10.0 parts by weight of the polyphenol compound, and 75.0 to 95.0 parts by weight of the delipidated rice bran, more preferably 4.5 to 10.0 parts by weight of the polymannose, 0.7 to 2.5 parts by weight of the polyphenol compound, and 78.0 to 88.0 parts by weight of the delipidated rice bran, and most preferably 5.5 to 8.0 parts by weight of the polymannose, 0.9 to 1.5 parts by weight of the polyphenol compound, and 80.0 to 85.0 parts by weight of the delipidated rice bran.

Incidentally, the formulation amount of the polyphenol compound can be adjusted to a lower level in the case where the polyphenol compound used in the producibility improver for poultry of the present invention comprises (+)-epigallocatechin gallate as the main component. Specifically, in such cases, the formulation ratios of the polymannose, the (−)-epigallocatechin gallate and the delipidated rice bran is preferably 3.0 to 13.0 parts by weight of the polymannose, 0.1 to 5.0 parts by weight of the (−)-epigallocatechin gallate, and 80.0 to 98.0 parts by weight of the delipidated rice bran, more preferably 4.5 to 10.0 parts by weight of the polymannose, 0.25 to 2.5 parts by weight of the (−)-epigallocatechin gallate, and 85.0 to 95.0 parts by weight of the delipidated rice bran, and most preferably 5.5 to 8.0 parts by weight of the polymannose, 0.3 to 1.0 part by weight of the (−)-epigallocatechin gallate, and 90.0 to 93.0 parts by weight of the delipidated rice bran.

The producibility improver for poultry of the present invention may be supplemented with an auxiliary additive as necessary, in addition to the above-mentioned polymannose, polyphenol compound and delipidated rice bran, as long as the auxiliary additive does not affect the effects of the present invention.

The term "producibility-improving actions" of the producibility improver for poultry of the present invention includes those given below, and the producibility improver of the present invention is used for various applications accomplished by these producibility-improving actions for poultry.

(1) used for suppression of decrease in liveability, from the viewpoint of having suppressing action in decrease in the liveability of laying hens (a ratio of a total number of laying hens at a given breeding period to total number of laying hens at initiation of breeding);

(2) used for increase or improvement in at least any one of actions i) to v), from the viewpoints of having i) an action of increase in each egg weight produced by laying hens (a total weight of shell eggs/total number of eggs laid); ii) an action of increase in an amount of eggs produced per day (shell egg weight per day per laying hen); iii) an action of increase in number of eggs produced (a total number of eggs per day produced by laying hens bred); iv) an action of increase in a weight of produced eggs (a total egg weight produced per day by laying hens bred); or v) an action of improvement in the rate of egg production for laying hens (a ratio of a total number of eggs to a total number of laying hens bred);

(3) used for suppression of decrease in Haugh unit, from the viewpoint of having a suppressing action of decrease in Haugh unit of eggs produced by laying hens during the storage (for example, 1 to 4 weeks of storage at 2° to 10° C.);

(4) used for suppression of decrease in vitamin E content, from the viewpoint of having a suppressing action of decrease in vitamin E content of eggs produced by laying hens during the storage (for example, 1 to 4 weeks of storage at 2° to 10° C.);

(5) used for suppression of decrease in highly unsaturated fatty acid content, from the viewpoint of having a suppressing action of decrease in highly unsaturated fatty acid content of eggs produced by laying hens during the storage (for example, 1 to 4 weeks of storage at 20 to 10° C.);

(6) used for suppression of decrease in content, from the viewpoint of having a suppressing action of decrease in content of a fatty acid selected from the group consisting of linoleic acid, arachidonic acid, α-linolenic acid, eicosapentaenoic acid, docosapentaenoic acid, DHA and EPA in eggs produced by laying hens during the storage (for example, 1 to 4 weeks of storage at 20 to 10° C.);

(7) used for suppression of decrease in liveability, from the viewpoint of having a suppressing action of decrease in liveability of edible chickens;

(8) used for improvements in a body weight gain and a weekly body weight gain, from the viewpoint of having an action of improving a body weight gain of edible chickens, or improving a weekly body weight gain of edible chickens;

(9) used for keeping freshness, from the viewpoint of keeping freshness of chicken meat produced by edible chickens;

(10) used for suppression of at least any one action of i) to iii), from the viewpoints of having i) a suppressing action of increase in K value of chicken meat of edible chickens; ii) a suppressing action of increase in TBA value of chicken meat; and iii) a suppressing action of increase in POV value of chicken meat; and

(11) used for lowering, from the viewpoint of having an action of lowering cholesterol content of chicken meat produced by edible chickens.

Here, the term "Haugh unit" mentioned above refers to an index showing an extent of deterioration of thick albumen and is defined as the numeral calculated using the equation:

$$\text{Haugh unit} = 100 \log(H - 1.7W^{0.37} + 7.6)$$

wherein H is a height (mm) of thick albumen; and W is an egg weight (g).

In addition, the highly unsaturated fatty acid (PUFA) mentioned above includes fatty acids of the ω-3 or ω-6 series having a carbon-carbon double bond, concretely including linoleic acid, arachidonic acid, α-linolenic acid, icosapentaenoic acid, docosapentaenoic acid, docosahexaenoic acid (DHA) and eicosapentaenoic acid (EPA).

In the present invention, the expression "keeping freshness of chicken meat" refers to suppression of an increase during storage in a numerical value, such as K value (ratio of inosine and hypoxanthine content to the sum of ATP, ADP, AMP, IMP, inosine and hypoxanthine contents in chicken meat as expressed in percentage), VBN value (a total amount of volatile basic substances, such as ammonia and trimethylamine, in chicken meat), TMA value (trimethylamine content in chicken meat) and polyamine content (total amount of decarboxylated products of free amino acids, such as putrescine, cadaverine, agmatine, histamine, tyramine, tryptamine and spermidine, in chicken meat), metmyoglobin formation ratio (ratio of myoglobin oxidized to metmyoglobin in muscular tissue of chicken meat), TBA value (ratio of fatty acids oxidized to fatty acids in chicken meat), POV value (peroxide value: ratio of oil or fat oxidized in chicken meat), and bacterial cell count (number of bacterial cells in chicken meat). In the present invention, it is preferable that at least one selected from the group consisting of K value, TBA value and POV value is used as an index for keeping freshness of chicken meat.

Because the K value is most generally used as an index for freshness, it is more preferable to use the K value as an index for keeping freshness of chicken meat.

2. Method of Improving Producibility of the Present Invention

One of the great features of the method of improving producibility of the present invention resides in the use of the producibility improver described above. In the present invention, the method is suitable for the improvement of the producibility of poultry, especially laying hens and edible chickens. According to the method of improving producibility of the present invention, various producibility-improving effects are achieved by the poultry producibility-improving actions described above.

In the method of improving producibility of the present invention, in cases of laying hens, the duration of addition of the producibility improver of the present invention to the feed is at least 4 months, preferably 8 months or more, and more preferably the entire breeding period, from the viewpoint of full performance of the desired improving effect on producibility. Furthermore, although the producibility improver of the present invention may be added to the feed for laying hens at any time during the breeding period, its addition is preferably started at the time when laying hens are housed in a poultry house. Therefore, in consideration of duration and tiring of feeding, the producibility improver of the present invention is preferably added during a period of at least 4 months after laying hens are housed in a poultry house, more preferably 8 months or more after laying hens are housed in a poultry house, and especially preferably for a period from laying hen housing in a poultry house to completion of breeding.

In the case of edible chickens, the duration of addition of the producibility improver of the present invention to the feed is at least 2 weeks, preferably 1 month or more, more preferably 2 months or more, and most preferably an entire breeding period, from the viewpoint of full performance of the desired improving effect on producibility. Furthermore, the producibiity improver of the present invention is preferably added to the feed for edible chickens during a period of at the latest 2 weeks before completion of breeding to the time of completion of breeding, more preferably from at least 1 month before completion of breeding to the time of completion of breeding, and most preferably from 2 or more months before completion of breeding to the time of completion of breeding. Addition timing of 2 weeks before completion of breeding to the time of completion of breeding is particularly effective; the effect of addition can be improved, even when the duration of addition is constant by including the addition period.

In the method of improving producibility of the present invention, the formulation amount of each component may be selected as appropriate according to the purpose of formulation for improved producibility. By formulating polymannose and the like in amounts very smaller than those of ordinary feed additives, a poultry producibility-improving effect of the present invention can be obtained. Specifically, preferable formulation ratios of each component formulated in the feed are as follows.

(i) As to the amount of the polymannose, the polymannose is added and supplied in a proportion of preferably 0.005 to 0.1 parts by weight, more preferably 0.01 to 0.05 parts by weight, and most preferably 0.015 to 0.03 parts by weight, based on 100 parts by weight of the supplying feed for poultry.

(ii) As to the amount of the polyphenol compound, the polyphenol compound is added and supplied in a proportion of preferably 0.005 to 0.1 parts by weight, more preferably 0.01 to 0.05 parts by weight, and most preferably 0.015 to 0.025 parts by weight, based on 100 parts by weight of the supplying feed for poultry.

Especially, when a compound comprising (−)-epigallocatechin gallate as a main component is formulated, the compound is added and supplied in a proportion of preferably 0.00001 to 0.02 parts by weight, more preferably 0.00005 to 0.01 parts by weight, and most preferably 0.0005 to 0.005 parts by weight.

(iii) As to the amount of the delipidated rice bran, the delipidated rice bran is added and supplied in a proportion of preferably 0.05 to 0.5 parts by weight more preferably 0.1 to 0.4 parts by weight, and most preferably 0.15 to 0.35 parts by weight, based on 100 parts by weight of the supplying feed for poultry.

In addition, in the method of improving producibility of the present invention, the total formulation amounts of the effective ingredients as the producibility improvers of the first to third embodiments are as follows:

1) the formulation amount of the producibility improver comprising the polymannose, which is the first embodiment of the present invention, to the feed is such that the polymannose is preferably 0.005 to 0.1 parts by weight, more preferably 0.01 to 0.05 parts by weight, and most preferably 0.015 to 0.03 parts by weight, based on 100 parts by weight of the feed.

2) the formulation amount of the producibility improver for poultry, the producibility improver comprising the polymannose and the polyphenol compound, which is the second embodiment of the present invention, to the feed s is such that the total amount of the two components mentioned above is preferably 0.005 to 0.8 parts by weight, more preferably 0.015 to 0.5 parts by weight, and most preferably 0.02 to 0.2 parts by weight, based on 100 parts by weight of the feed.

3) the formulation amount of the producibility improver for poultry, the producibility improver flirther comprising the delipidated rice bran in addition to the polymannose and the polyphenol compound, which is the third embodiment of the present invention, to the feed is such that the total amount of the three components mentioned above is preferably 0.05 to 0.5 parts by weight, more preferably 0.1 to 0.4 parts by weight, and most preferably 0.15 to 0.35 parts by weight, based on 100 parts by weight of the feed.

EXAMPLES

The present invention will be described in firther detail on the basis of the following Examples andthe like, but is not intended to be particularly limited only to Examples.

Example 1

Eight-hundred and thirty-seven parts of 0.1 M citric acid and 63 parts of 0.1 M sodium citrate were added to 900 parts of water, to adjust the pH to 3.0. To this solution were added and mixed 1.0 part of β-mannanase derived from a fungus of the genus Aspergillus (manufactured by Novo Nordisk K.K., trade name: Viscozyne, 1000 units) and 100 parts of guar gum powder, and the resulting mixture was reacted at 40° to 45° C. for 24 hours. After the termination of the reaction, the enzyme was inactivated by heating the mixture at 90° C. for 15 minutes. Insoluble substances were removed by filtration, and the resulting transparent solution was concentrated under reduced pressure. The resulting concentrate (solid content: 20%) was spray-dried, to give 65 parts of a white powder of a polygalactomannan.

In addition, the molecular weight distribution was determined by high performance liquid chromatography (flow rate: 1.0 mmin, 40° C., eluent: 0.2 M BUS phosphate buffer (pH 6.9)) using G6000PW (manufactured by Tosoh Corporation). The content (%) of the polygalactomannan having a molecular weight of from $1.8 \times 10^3$ to $1.8 \times 10^5$, as calculated from the areal ratio, was found to be 80.6%. In addition, the polygalactomannan was shown to contain 30.5% polygalactomannan having mannose polymerization degree of from 30 to 40 units. Incidentally, in this case, a linear dextrin of known degrees of glucose polymerization (glucose polymerization degree: 10, 100, 500, 1000) was used as a standard reagent for sugar chain unit.

Comparative Example 1 and Comparative Example 2

A polygalactomannan having a short, linear chain of mannose was prepared in the same manner as in Example 1 except for changing only the reaction time to 48 hours (Comparative Example 1). The molecular weight distribution of the resulting polygalactomannan was determined in the same manner as in Example 1. The content (%) of the polygalactomannan, having a molecular weight of from $1.8 \times 10^3$ to $1.8 \times 10^5$, as calculated from the areal ratio. was found to be 15.1%. In addition, the polygalactomannan was shown to contain 2.3% polygalactomannan having mannose polymerization degree of from 30 to 40 units, and 80% or more of the polymerization degrees of the mannose were found to be within the range of from 2 to 20 units.

In addition, guar gum powder was used as Comparative Example 2.

Further, the viscosity and the dietary fiber content for each of the polygalactomannan obtained in Example 1, the polygalactomannan obtained in Comparative Example 1, and the guar gum powder of Comparative Example 2 were determined. The viscosity was determined by measuring the viscosity of a 5% aqueous solution at 5° C. using a Brookfield viscometer, and the dietary fiber content was determined by AOAC Official Methods. The results are shown in Table 1.

TABLE 1

|  | Example 1 | Comparative Example 1 | Comparative Example 2 |
| --- | --- | --- | --- |
| Content (%) of those having a molecular weight of from $1.8 \times 10^3$ to $1.8 \times 10^5$ | 80.6 | 15.1 | 3.4 |
| Content (%) of those having a polymerization degree of from 30 to 40 | 30.5 | 2.3 | 0.03 |
| Viscosity | 13 cps | 3 cps | 100,000 cps |
| Dietary Fiber Content | 75% | 50% | 75% |

Example 2

About 500 liters of water was added to 100 kg of green tea, with agitation, and the miicte was subjected to extraction at 80° C. for 3 hours. The extract obtained by filtering the residue was spraydried, to give 35 kg of a polyphenol compound having 25% purity. The composition of the ingredients of the resulting polyphenol compound was as follows: (+)catechin 1.4% by weight; (+)-gallocatechin 5.8% by weight; (+)-gallocatechin gallate 4.5% by weight; (−)-epicatechin 2.7% by weight; (−)-epicatechin gallate 1.8% by weight; (−)-epigallocatechin 5.8% by weight; and (−)-epigallocatechin gallate 7.0% by weight.

Example 3

A 1.2 kg portion of the polyphenol compound obtained in Example 2 was partitioned with ethyl acetate, to give 400 g of an ethyl acetate-soluble fraction. The fraction was sequentially subjected to silica gel chromatography (flow rate: 100 cm/hr, 25° C., solvent: chloroform/methyl alcohol= 20/1 or 10/1 (v/v)), Sephadex LH-20 (flow rate: 100 cm/hr, 25° C., solvent: methyl alcohol), and recycle HPLC (flow rate: 3 ml/min, room temperature, LC-908, CS-320 column, manufactured by Nippon Bunseki Kogyo, solvent: methyl alcohol), to thereby give each of the polyphenol compounds: (+)-catechin 12 g; (+)-gallocatechin 48.8 g; (−)-gallocatechin gallate 36 g; (−)-epicatechin 20 g; (−)-epicatechin gallate 15.2 g; (−)-epigallocatechin 48 g; and (−)-epigallocatechin gallate 60 g.

Example 4

Two-hundred ldlograms of extraction lees of rice bran oil produced during an extraction process for rice bran oil was subjected to a desolvation treatment. Thereafter, the resulting desolvated product was dried in a drum dryer, and cooled, to thereby give 180 kg of delipidated rice bran. The composition of the ingredients of the resulting delipidated rice bran was as follows: water 12% by weight; coarse proteins 17% by weight; coarse fiber 10% by weight; and ash content 11% by weight.

Example 5

Seven kilograms of the polygalactomannan obtained in Example 1 and 5 kg of the polyphenol compound obtained in Example 2 were mixed with agitation in a mixer, to give 12 kg of a producibility improver for poultry.

Example 6

Ten kilograms of the polygalactomannan obtained in Example 1 and 1 kg of (−)-epigallocatechin gallate obtained in Example 3 were mixed with agitation in a mixer, to give 11 kg of a producibility improver for poultry.

Example 7

Seven kilograms of the polygalactomannan obtained in Example 1, 5 kg of the polyphenol compound obtained in Example 2 and 88 kg of the delipidated rice bran obtained in Example 4 were mixed with agitation in a mixer, to give 100 kg of a producibility improver for poultry.

Example 8

The amount 7.5 kg of the polygalactomannan obtained in Example 1, 0.5 kg of (+)-epigallocatechin gallate obtained in Example 3 and 92 kg of the delipidated rice bran obtained in Example 4 were mixed with agitation in a mixer, to give 100 kg of a producibility improver for poultry.

Comparative Example 3

Seven kilograms of the polygalactomannan obtained in Comparative Example 1 and 5 kg of the polyphenol compound obtained in Example 2 were mixed with agitation in a mixer, to give 12 kg of a producibility improver for poultry.

Comparative Example 4

Seven kilograms of the gaar gum powder obtained in Comparative Example 2 and 5 kg of the polyphenol compound obtained in Example 2 were mixed with agitation in a mixer, to give 12 kg of a producibility improver for poultry.

Comparative Example 5

Seven kilograms of the polygalactomannan obtained in Comparative Example 1, 5 kg of the polyphenol compound obtained in Example 2 and 88 kg of the delipidated rice bran obtained in Example 4 were mixed with agitation in a mixer, to give 100 kg of a producibility improver for poultry.

Comparative Example 6

Seven kdlograms of the guar gum powder of Comparative Example 2, 5 kg of the polyphenol compound obtained in Example 2 and 88 kg of the delipidated rice bran obtained in Example 4 were mixed with agitation in a mixer, to give 100 kg of a producibility improver for poultry.

Comparative Example 7

Ten kilograms of the polygalactomannan obtained in Example 1 and 1 kg of (+)-catechin obtained in Example 3 were mixed with agitation in a mixer, to give 11 kg of a producibility improver for poultry.

Comparative Example 8

The amount 7.5 kg of the polygalactomainnan obtained in Example 1, 0.5 kg of (+)catechin obtained in Example 3 and 92 kg of the delipidated rice bran obtained in Example 4 were mixed with agitation in a mixer, to give 100 kg of a producibility improver for poultry.

Comparative Example 9

Eight kilograms of the polyphenol compound obtained in Example 2 and 92 kg of the delipidated rice bran obtained in Example 4 were mixed with agitation in a mixer, to give 100 kg of a producibility improver for poultry.

Test Example 1

White Leghorn laying hens at 121 days of age were housed in poultry houses of the windless vertical 6-shelf cage type and bred therein for 1 year. Eighteen poultry houses A to R (30,000 hens/poultry house) were set, and a field test concerning improvement in producibility by laying hens was carried out.

The laying hens were fed with a commercially available formula feed for laying hens, and allowed to take water ad libitum. Table 2 shows the kinds of producibility improvers for poultry given to the laying hens and the amounts thereof added to the feed during the entire breeding period.

As indices for the producibility, there were obtained a liveability, a rate of laying, each egg weight and a weight of eggs produced per day, each item being at 4 months after initiation of the test, and a total number of eggs produced and a total egg weight during the 4-month period from initiation of the test. The same items were also determined at 8 and 12 months after initiation of the test. Table 3 shows a liveability, Table 4 a rate of egg production, Table 5 each egg weight, Table 6 a weight of eggs produced per day, Table 7 the number of eggs produced and Table 8 a weight of produced eggs, respectively. In the following tables, the indications "4M, 8M, 12M" stand for 4 months, 8 months, and 12 months after initiation of the test, respectively.

As shown in Tables 3 to 8, in the poultry houses A to E in comparison with the poultry houses H to R, there were found suppression of decreases in the liveability and the rate of egg production, and there were found increases in each egg weight, the weight of eggs produced per day, the number of eggs produced, and the weight of produced eggs.

On the other hand, similar effects to that of the poultry house A were also found in the poultry house F and the poultry house G, but the effects were not as great as that obtained in the poultry house C or the poultry house E. Even when (+)-catechin was used in combination with the polygalactomannan obtained in Example 1, only the effect of the polygalactomannan was exhibited, and no combined effect was found. Similarly, even when (+)-catechin was used in combination with the polygalactomannan obtained in Example 1 and the delipidated rice bran obtained in Example 4, only the effect of the polygalactomannan was exhibited, and no combined effect was found. In addition, it is evident from the results for the poultry houses H to J that the effects exhibited by using each of a polyphenol compound, (−)-epigallocatechin gallate, or delipidated rice bran alone were comparable to those obtained for the poultry house Q in which only an ordinary feed was given, and an effect of addition of these additives was not found. In addition, it is evident from the Be results for the poultry house R that an effect was not found when only the polyphenol compound and the delipidated rice bran were used in combination.

Furthermore, after 4 months from initiation of the test, 20 eggs each were collected from each poultry house. Haugh unit and vitamin E content were determined on the day of collection for 10 of the eggs, and after 2 weeks of storage at 4° C. for the remaining 10 eggs, respectively. A change in the Hauih units and a change in the vitamin E contents are shown in Tables 9 and 10, respectively. As shown in Tables 9 and 10, in the poultry houses A to E in comparison with the poultry houses H to R, a decrease in the Haugh unit and a decrease in the vitamin E content during egg storage were suppressed.

Also, similar effects to those of the poultry house A were found in the poultry house F and the poultry house G, but the effects were not as great as that obtained in the poultry house C or the poultry house E as described above, and no combined effect with (+)-catechin was found. In addition, no effect was found for a case where the polyphenol compound, (−)-epigallocatechin gallate or the delipidated rice bran was respectively used alone.

TABLE 2

| Poultry House | Polygalacto-mannan Obtained in Example 1 | Polyphenol Compound Obtained in Example 2 | (−)-Epigallo-catechin Gallate Obtained in Example 3 | Delipidated Rice Bran Obtained in Example 4 | Producibility Improver for Poultry Obtained in Example 5 | Producibility Improver for Poultry Obtained in Example 6 | Producibility Improver for Poultry Obtained in Example 7 | Producibility Improver for Poultry Obtained in Example 8 |
|---|---|---|---|---|---|---|---|---|
| A | 0.025% | | | | | | | |
| B | | | | | 0.050% | | | |
| C | | | | | | 0.025% | | |
| D | | | | | | | 0.250% | |
| E | | | | | | | | 0.250% |
| F | | | | | | | | |
| G | | | | | | | | |
| H | | 0.020% | | | | | | |
| I | | | $1.40 \times 10^{-3}$% | | | | | |
| J | | | | 0.250% | | | | |
| K | | | | | | | | |
| L | | | | | | | | |
| M | | | | | | | | |
| N | | | | | | | | |
| O | | | | | | | | |
| P | | | | | | | | |
| Q | | | | | | | | |
| R | | | | | | | | |

| Poultry House | Polygalacto-mannan of Comparative Example 1 | Guar Gum Powder of Comparative Example 2 | Producibility Improver for Poultry Obtained in Comparative Example 3 | Producibility Improver for Poultry Obtained in Comparative Example 4 | Producibility Improver for Poultry Obtained in Comparative Example 5 | Producibility Improver for Poultry Obtained in Comparative Example 6 | Producibility Improver for Poultry Obtained in Comparative Example 7 | Producibility Improver for Poultry Obtained in Comparative Example 8 | Producibility Improver for Poultry Obtained in Comparative Example 9 |
|---|---|---|---|---|---|---|---|---|---|
| A | | | | | | | | | |
| B | | | | | | | | | |
| C | | | | | | | | | |
| D | | | | | | | | | |
| E | | | | | | | | | |
| F | | | | | | | | 0.025% | |
| G | | | | | | | | | 0.250% |
| H | | | | | | | | | |
| I | | | | | | | | | |
| J | | | | | | | | | |
| K | 0.025% | | | | | | | | |
| L | | 0.025% | | | | | | | |
| M | | | 0.050% | | | | | | |
| N | | | | 0.050% | | | | | |
| O | | | | | 0.250% | | | | |

TABLE 2-continued

| | |
|---|---|
| P | 0.250% |
| Q | |
| R | 0.250% |

TABLE 3

Liveability

| Poultry House | 4M (%) | 8M (%) | 12M (%) |
|---|---|---|---|
| A | 99.33 | 98.77 | 97.40 |
| B | 99.42 | 98.82 | 97.48 |
| C | 99.55 | 99.00 | 98.00 |
| D | 99.61 | 99.10 | 98.11 |
| E | 99.75 | 99.18 | 98.32 |
| F | 98.95 | 97.95 | 97.00 |
| G | 99.00 | 98.00 | 97.22 |
| H | 98.87 | 97.88 | 95.00 |
| I | 98.90 | 97.81 | 95.02 |
| J | 98.89 | 97.82 | 95.21 |
| K | 98.96 | 97.88 | 95.10 |
| L | 98.99 | 97.88 | 95.00 |
| M | 98.97 | 97.86 | 94.90 |
| N | 98.99 | 97.83 | 94.12 |
| O | 98.91 | 97.80 | 94.00 |
| P | 98.90 | 97.79 | 94.39 |
| Q | 98.96 | 97.86 | 94.90 |
| R | 98.90 | 97.80 | 94.91 |

TABLE 4

Rate of Egg Production

| Poultry House | 4M (%) | 8M (%) | 12M (%) |
|---|---|---|---|
| A | 94.0 | 85.9 | 75.5 |
| B | 94.2 | 86.3 | 75.8 |
| C | 95.0 | 87.1 | 76.5 |
| D | 96.1 | 88.0 | 77.3 |
| E | 97.3 | 88.7 | 78.1 |
| F | 93.1 | 84.2 | 74.1 |
| G | 93.5 | 85.0 | 74.9 |
| H | 92.0 | 82.7 | 73.1 |
| I | 92.3 | 82.9 | 72.9 |
| J | 92.0 | 82.4 | 73.0 |
| K | 92.2 | 83.0 | 73.1 |
| L | 92.1 | 83.2 | 73.5 |
| M | 92.4 | 83.0 | 73.7 |
| N | 92.0 | 82.8 | 73.5 |
| O | 92.3 | 82.8 | 73.6 |
| P | 92.0 | 82.4 | 73.2 |
| Q | 92.3 | 82.8 | 73.4 |
| R | 92.1 | 82.6 | 73.1 |

TABLE 5

Each Egg Weight

| Poultry House | 4M (g) | 8M (g) | 12M (g) |
|---|---|---|---|
| A | 60.9 | 63.9 | 65.8 |
| B | 61.3 | 64.2 | 66.2 |
| C | 62.3 | 65.0 | 67.0 |
| D | 62.9 | 65.6 | 67.3 |
| E | 63.4 | 65.9 | 67.9 |
| F | 59.0 | 62.0 | 64.3 |
| G | 59.9 | 62.5 | 65.0 |
| H | 58.5 | 61.2 | 63.1 |
| I | 58.6 | 61.7 | 63.1 |
| J | 58.2 | 61.5 | 63.4 |
| K | 58.3 | 61.7 | 63.0 |
| L | 58.7 | 61.9 | 63.3 |
| M | 58.5 | 61.7 | 63.2 |
| N | 59.0 | 61.8 | 63.0 |
| O | 58.5 | 61.2 | 63.1 |
| P | 58.5 | 61.5 | 63.3 |
| Q | 58.4 | 61.6 | 63.0 |
| R | 58.6 | 61.4 | 63.1 |

TABLE 6

Weight of Eggs Produced Per Day

| Poultry House | 4M (g) | 8M (g) | 12M (g) |
|---|---|---|---|
| A | 56.95 | 55.37 | 48.44 |
| B | 57.74 | 55.40 | 48.59 |
| C | 59.01 | 55.93 | 48.77 |
| D | 59.59 | 56.67 | 49.10 |
| E | 59.99 | 56.93 | 49.89 |
| F | 56.00 | 54.92 | 48.13 |
| G | 55.83 | 54.03 | 47.90 |
| H | 53.99 | 51.00 | 47.68 |
| I | 53.97 | 51.05 | 47.68 |
| J | 54.02 | 50.97 | 47.71 |
| K | 53.99 | 51.09 | 47.75 |
| L | 53.88 | 51.08 | 47.69 |
| M | 53.97 | 51.03 | 47.78 |
| N | 54.00 | 50.99 | 47.79 |
| O | 53.95 | 51.11 | 47.77 |
| P | 53.94 | 51.10 | 47.70 |
| Q | 53.90 | 51.00 | 47.75 |
| R | 53.91 | 51.04 | 47.73 |

TABLE 7

Number of Eggs Produced

| Poultry House | 4M (ct) | 8M (ct) | 12M (ct) |
|---|---|---|---|
| A | 348,242 | 778,862 | 1,102,934 |
| B | 350,152 | 778,862 | 1,103,764 |
| C | 359,279 | 783,945 | 1,142,892 |
| D | 361,321 | 791,811 | 1,188,212 |
| E | 369,111 | 801,234 | 1,203,412 |
| F | 331,456 | 732,912 | 1,099,231 |
| G | 330,289 | 730,234 | 1,071,923 |
| H | 295,789 | 715,293 | 1,053,962 |
| I | 295,589 | 714,941 | 1,054,111 |
| J | 295,242 | 715,026 | 1,054,265 |
| K | 295,045 | 715,002 | 1,053,946 |
| L | 295,089 | 714,376 | 1,053,412 |
| M | 295,012 | 714,672 | 1,052,934 |
| N | 294,987 | 714,913 | 1,054,555 |
| O | 295,103 | 714,586 | 1,054,321 |
| P | 295,142 | 714,991 | 1,053,333 |
| Q | 295,079 | 714,890 | 1,053,343 |
| R | 295,183 | 714,897 | 1,053,299 |

TABLE 8

Weight of Produced Eggs

| Poultry House | 4M (kg) | 8M (kg) | 12M (kg) |
|---|---|---|---|
| A | 21,207.9 | 49,649.8 | 72,573.1 |
| B | 21,464.3 | 50,002.9 | 73,069.2 |
| C | 22,383.1 | 50,956.4 | 76,573.8 |
| D | 22,727.1 | 51,942.8 | 79,966.7 |
| E | 23,401.6 | 52,801.3 | 81,711.7 |
| F | 19,555.9 | 45,440.5 | 70,680.6 |
| G | 19,784.3 | 45,639.6 | 69,675.0 |
| H | 17,303.7 | 43,775.9 | 66,505.0 |
| I | 17,321.5 | 44,111.9 | 66,514.4 |
| J | 17,183.1 | 43,974.1 | 66,840.4 |
| K | 17,201.1 | 44,115.6 | 66,398.6 |
| L | 17,321.7 | 44,219.9 | 66,681.0 |
| M | 17,258.2 | 44,095.3 | 66,545.4 |
| N | 17,404.2 | 44,181.6 | 66,437.0 |
| O | 17,263.5 | 43,732.7 | 66,527.7 |
| P | 17,265.8 | 43,971.9 | 66,676.0 |
| Q | 17,232.6 | 44,037.2 | 66,360.6 |
| R | 17,297.7 | 43,894.7 | 66,463.2 |

TABLE 9

Change in Haugh Unit

| Poultry House | Immediately After Egg Production | After 2 Weeks of Storage |
|---|---|---|
| A | 98.3 | 87.3 |
| B | 96.0 | 89.2 |
| C | 97.5 | 92.1 |
| D | 98.3 | 93.0 |
| E | 98.0 | 94.1 |
| F | 97.8 | 85.5 |
| G | 97.3 | 85.0 |
| H | 97.5 | 79.4 |
| I | 98.0 | 79.9 |
| J | 97.5 | 79.3 |
| K | 98.2 | 80.0 |
| L | 96.6 | 80.5 |
| M | 98.2 | 81.4 |
| N | 98.0 | 80.3 |
| O | 98.1 | 79.2 |
| P | 97.3 | 79.0 |
| Q | 96.9 | 79.1 |
| R | 97.6 | 79.5 |

The numerical values are a mean value for 5 eggs.

TABLE 10

Change in Vitamin E Content

| Poultry House | Immediately After Egg Production | After 2 Weeks of Storage |
|---|---|---|
| A | 3.2 | 2.3 |
| B | 3.1 | 2.5 |
| C | 3.3 | 2.7 |
| D | 3.2 | 2.9 |
| E | 3.2 | 3.2 |
| F | 3.1 | 2.2 |
| G | 3.1 | 2.1 |
| H | 3.4 | 2.0 |
| I | 3.1 | 2.0 |
| J | 3.2 | 2.0 |
| K | 3.3 | 1.7 |
| L | 3.2 | 2.1 |
| M | 3.1 | 2.0 |
| N | 3.4 | 1.9 |
| O | 3.0 | 2.0 |
| P | 3.3 | 1.8 |
| Q | 3.4 | 1.9 |
| R | 3.1 | 1.7 |

The numerical values are expressed in mg based on 100 g of egg yolk solution.

Test Example 2

Isabrown laying hens were bred in poultry houses of the windless vertical 2-shelf cage type. Seventeen poultry houses a to q (10,000 hens/poultry house) were set, and a field test concerning suppression of a decrease in highly unsaturated fatty acid content during storage of eggs laid by laying hens was carried out. Table 11 shows the kinds of producibility improvers for poultry of the present invention given to the laying hens and the amounts thereof added to the feed during the entire breeding period. In addition, the laying hens were fed with a feed prepared by adding 2 kg of a fish oil and 10 g of vitamin E to 100 kg of a cormnercially available feed for laying hens. In addition, the laying hens were allowed to take water ad libitum.

After 4 months from initiation of the test, 20 eggs each were collected from each poultry house. DHA content and EPA content of the eggs, as indices for highly unsaturated fatty acid, were determined on the day of collection for 10 of the eggs, and after 2 weeks of storage at 4° C. for the remaining 10 eggs, respectively. Vitamin E content and Haugh unit were also determined. A change in the DHA content, a change in the EPA content, a change in the vitamin E content, and a change in the Haugh unit are shown in Tables 12, 13, 14 and 15, respectively.

As shown in Tables 12 and 13, in the poultry houses a to e in comparison with the poultry houses h to q, decreases in the DHA content and in the EPA content, i.e., the highly unsaturated fatty acid content, during egg storage were suppressed.

Further, as shown in Tables 14 and 15, in the poultry houses a to e in comparison with the poultry houses h to q, a decrease in the vitamin E content and a decrease in Haugh unit during egg storage were suppressed.

Also, similar effects to that of the poultry house a were found in the poultry house f and the poultry house g, but the effects were not as great as that obtained in the poultry house c or the poultry house e, and no combined effect with (+)catechin was found in this test, either. In addition, no effect was found for a case where the polyphenol compound, (−)-epigallocatechin gallate or the delipidated rice bran was respectively used alone.

TABLE 11

| Poultry House | Polygalacto-mannan Obtained in Example 1 | Polyphenol Compound Obtained in Example 2 | (−)-Epigallo-catechin Gallate Obtained in Example 3 | Delipidated Rice Bran Obtained in Example 4 | Producibility Improver for Poultry Obtained in Example 5 | Producibility Improver for Poultry Obtained in Example 6 | Producibility Improver for Poultry Obtained in Example 7 | Producibility Improver for Poultry Obtained in Example 8 |
|---|---|---|---|---|---|---|---|---|
| a | 0.025% | | | | | | | |
| b | | | | | 0.050% | | | |
| c | | | | | | 0.025% | | |
| d | | | | | | | 0.250% | |
| e | | | | | | | | 0.250% |
| f | | | | | | | | |
| g | | | | | | | | |
| h | | 0.020% | | | | | | |
| I | | | 1.40 × 10⁻³% | | | | | |
| j | | | | 0.250% | | | | |
| k | | | | | | | | |
| l | | | | | | | | |
| m | | | | | | | | |
| n | | | | | | | | |
| o | | | | | | | | |
| p | | | | | | | | |
| q | | | | | | | | |

| Poultry House | Polygalacto-mannan of Comparative Example 1 | Guar Gum Powder of Comparative Example 2 | Producibility Improver for Poultry Obtained in Comparative Example 3 | Producibility Improver for Poultry Obtained in Comparative Example 4 | Producibility Improver for Poultry Obtained in Comparative Example 5 | Producibility Improver for Poultry Obtained in Comparative Example 6 | Producibility Improver for Poultry Obtained in Comparative Example 7 | Producibility Improver for Poultry Obtained in Comparative Example 8 |
|---|---|---|---|---|---|---|---|---|
| a | | | | | | | | |
| b | | | | | | | | |
| c | | | | | | | | |
| d | | | | | | | | |
| e | | | | | | | | |
| f | | | | | | | 0.050% | |
| g | | | | | | | | 0.050% |
| h | | | | | | | | |
| I | | | | | | | | |
| j | | | | | | | | |
| k | 0.025% | | | | | | | |
| l | | 0.025% | | | | | | |
| m | | | 0.050% | | | | | |
| n | | | | 0.050% | | | | |
| o | | | | | 0.250% | | | |
| p | | | | | | 0.250% | | |
| q | | | | | | | | |

The numerical values are the amount added to the feed.

TABLE 12

Change in DHA Content

| Poultry House | Immediately After Egg Production | After 2 Weeks of Storage |
|---|---|---|
| a | 1,493.1 | 1,488.2 |
| b | 1,494.2 | 1,489.2 |
| c | 1,492.6 | 1,490.3 |
| d | 1,493.3 | 1,491.5 |
| e | 1,494.0 | 1,494.0 |
| f | 1,493.2 | 1,475.4 |
| g | 1,493.5 | 1,470.0 |
| h | 1,493.9 | 1,341.3 |
| i | 1,493.1 | 1,344.0 |
| j | 1,494.1 | 1,344.2 |
| k | 1,496.2 | 1,343.4 |
| l | 1,495.5 | 1,342.9 |
| m | 1,493.5 | 1,348.2 |
| n | 1,498.2 | 1,341.2 |
| o | 1,493.2 | 1,341.4 |
| p | 1,494.3 | 1,342.2 |
| q | 1,495.0 | 1,345.5 |

The numerical values are expressed in mg based on 100 g of egg yolk solution.

TABLE 13

Change in EPA Content

| Poultry House | Immediately After Egg Production | After 2 Weeks of Storage |
|---|---|---|
| a | 103.7 | 98.9 |
| b | 104.0 | 100.2 |
| c | 104.3 | 102.1 |
| d | 104.3 | 103.0 |
| e | 104.5 | 104.3 |
| f | 103.9 | 96.5 |
| g | 103.4 | 96.0 |

TABLE 13-continued

Change in EPA Content

| Poultry House | Immediately After Egg Production | After 2 Weeks of Storage |
|---|---|---|
| h | 104.1 | 83.5 |
| i | 103.8 | 84.0 |
| j | 103.8 | 83.9 |
| k | 104.0 | 85.1 |
| l | 103.2 | 83.9 |
| m | 103.5 | 84.0 |
| n | 103.9 | 84.2 |
| o | 104.1 | 84.0 |
| p | 104.2 | 83.4 |
| q | 194.4 | 83.5 |

The numerical values are expressed in mg based on 100 g of egg yolk solution.

TABLE 14

Change in Vitamin E Content

| Poultry House | Immediately After Egg Production | After 2 Weeks of Storage |
|---|---|---|
| a | 3.0 | 2.3 |
| b | 3.2 | 2.6 |
| c | 3.1 | 2.9 |
| d | 3.1 | 3.0 |
| e | 3.2 | 3.2 |
| f | 3.2 | 2.0 |
| g | 3.1 | 1.9 |
| h | 3.0 | 1.5 |
| i | 3.0 | 1.7 |
| j | 3.1 | 1.6 |
| k | 3.2 | 1.6 |
| l | 3.0 | 1.7 |
| m | 3.2 | 1.6 |
| n | 3.2 | 1.6 |
| o | 3.0 | 1.5 |
| p | 3.1 | 1.7 |
| q | 3.2 | 1.6 |

The numerical values are expressed in mg based on 100 g of egg yolk solution.

TABLE 15

Change in Haugh Unit

| Poultry House | Immediately After Egg Production | After 2 Weeks of Storage |
|---|---|---|
| a | 97.8 | 89.3 |
| b | 96.1 | 90.2 |
| c | 97.2 | 93.0 |
| d | 96.5 | 94.5 |
| e | 96.8 | 96.0 |
| f | 96.4 | 85.6 |
| g | 96.5 | 84.2 |
| h | 97.1 | 80.3 |
| i | 96.5 | 80.9 |
| j | 96.3 | 80.2 |
| k | 96.7 | 80.9 |
| l | 96.6 | 81.5 |
| m | 98.0 | 81.0 |
| n | 96.2 | 80.0 |
| o | 96.7 | 79.6 |
| p | 96.9 | 80.1 |
| q | 96.3 | 78.9 |

The numerical values are a mean value for 5 eggs.

Test Example 3

White Cornish edible chickens were bred for 7 weeks from newly-hatched chickens. The hatched chickens were divided into 17 groups, the groups AA to QQ of 200 chickens per group. Table 16 shows the kinds of the producibility improvers for poultry of the present invention and the amounts thereof added to the feed. The edible chickens were fed with a commercially available formula feed for edible chickens, and allowed to take feed and water ad libitum.

After breeding the edible chickens for 7 weeks, a liveability and a weekly body weight gain were obtained by determining the numbers and the weights of the edible chickens. The liveability is shown in Table 17 and the weekly body weight gain in Table 18, respectively. After breeding for another 7 weeks, 5 edible chickens each from each poultry house were slaughtered, 50 g each of breast meat, leg meat and chicken fat were cut out at 2 pieces per chicken, and cholesterol contents were then determined. In addition, 5 chickens each from each poultry house were pick up, and 50 g each of breast meat and leg meat were cut out at 2 pieces per chicken, and K values of the breast meat and the leg meat after 10 days of storage at 4° C. were determined by using a kit for determining K value manufactured by Daiichi Pharmaceutical Co., Ltd. Furthermore, changes in the TBA value and in the POV value of each of the breast meat, the leg meat and the chicken fat after storage were determined in the same manner. The cholesterol content is shown in Table 19, the change in the K value after storage in Table 20, the change in the TBA value after storage in Table 21, and the change in the POV value after storage in Table 22, respectively.

As shown in Tables 17 and 18, in the groups AA to EE in comparison with the groups HH to QQ, the decrease in the liveability was suppressed, and the weekly body weight gain was increased. Furthermore, as shown in Table 19, in the groups AA to EE in comparison with the groups HH to QQ, the cholesterol contents of breast meat, leg meat and chicken fat were decreased. In addition, in the groups AA to EE in comparison with the groups HH to QQ, as shown in Table 20, increases in the K values of breast meat and leg meat after 10 days of storage were suppressed. Furthermore, in the groups AA to EE in comparison with the groups HH to QQ, as shown in Tables 21 and 22, increases in the TBA value and the POV value of breast meat, leg meat and chicken fat were suppressed.

Also, similar effects to those of the group AA were also found in the group FF and the group GG, but the effects were not as great as that obtained in the group CC or the group EE. In this test as well, no combined effect with (+)-catechin was found. In addition, no effect was found for a case where the to polyphenol compound, (−)-epigallocatechin gallate or the delipidated rice bran. was respectively used alone.

TABLE 16

| Group | Polygalacto-mannan Obtained in Example 1 | Polyphenol Compound Obtained in Example 2 | (−)-Epigallo-catechin Gallate Obtained in Example 3 | Delipidated Rice Bran Obtained in Example 4 | Producibility Improver for Poultry Obtained in Example 5 | Producibility Improver for Poultry Obtained in Example 6 | Producibility Improver for Poultry Obtained in Example 7 | Producibility Improver for Poultry Obtained in Example 8 |
|---|---|---|---|---|---|---|---|---|
| AA | 0.025% | | | | | | | |
| BB | | | | | 0.050% | | | |
| CC | | | | | | 0.025% | | |
| DD | | | | | | | 0.250% | |
| EE | | | | | | | | 0.250% |
| FF | | | | | | | | |
| GG | | | | | | | | |
| HH | | 0.020% | | | | | | |
| II | | | $1.40 \times 10^{-3}$% | | | | | |
| JJ | | | | 0.250% | | | | |
| KK | | | | | | | | |
| LL | | | | | | | | |
| MM | | | | | | | | |
| NN | | | | | | | | |
| OO | | | | | | | | |
| PP | | | | | | | | |
| QQ | | | | | | | | |

| Group | Polygalacto-mannan of Comparative Example 1 | Guar Gum Powder of Comparative Example 2 | Producibility Improver for Poultry Obtained in Comparative Example 3 | Producibility Improver for Poultry Obtained in Comparative Example 4 | Producibility Improver for Poultry Obtained in Comparative Example 5 | Producibility Improver for Poultry Obtained in Comparative Example 6 | Producibility Improver for Poultry Obtained in Comparative Example 7 | Producibility Improver for Poultry Obtained in Comparative Example 8 |
|---|---|---|---|---|---|---|---|---|
| AA | | | | | | | | |
| BB | | | | | | | | |
| CC | | | | | | | | |
| DD | | | | | | | | |
| EE | | | | | | | | |
| FF | | | | | | | 0.050% | |
| GG | | | | | | | | 0.050% |
| HH | | | | | | | | |
| II | | | | | | | | |
| JJ | | | | | | | | |
| KK | 0.025% | | | | | | | |
| LL | | 0.025% | | | | | | |
| MM | | | 0.050% | | | | | |
| NN | | | | 0.050% | | | | |
| OO | | | | | 0.250% | | | |
| PP | | | | | | 0.250% | | |
| QQ | | | | | | | | |

The numerical values are the amount added to the feed.

TABLE 17

Liveability

| Group | (%) |
|---|---|
| AA | 97.43 |
| BB | 98.02 |
| CC | 98.45 |
| DD | 98.92 |
| EE | 99.52 |
| FF | 97.21 |
| GG | 97.00 |
| HH | 96.69 |
| II | 96.33 |
| JJ | 96.48 |
| KK | 96.71 |
| LL | 96.74 |
| MM | 96.72 |
| NN | 96.69 |
| OO | 96.68 |
| PP | 96.73 |
| QQ | 96.70 |

TABLE 18

Weekly Body Weight Gain

| Group | g |
|---|---|
| AA | 469.6 |
| BB | 472.3 |
| CC | 475.1 |
| DD | 482.3 |
| EE | 487.9 |
| FF | 465.8 |
| GG | 466.3 |
| HH | 461.6 |
| II | 462.5 |
| JJ | 463.1 |
| KK | 460.2 |
| LL | 460.8 |
| MM | 462.4 |
| NN | 461.3 |
| OO | 462.1 |
| PP | 461.2 |
| QQ | 460.0 |

TABLE 19

Cholesterol Content

| Group | Breast Meat | Leg Meat | Chicken Fat |
|---|---|---|---|
| AA | 53.4 | 71.2 | 179.9 |
| BB | 51.1 | 68.2 | 172.1 |
| CC | 50.3 | 61.4 | 164.3 |
| DD | 49.5 | 60.3 | 162.7 |
| EE | 48.7 | 59.1 | 160.3 |
| FF | 61.3 | 69.6 | 185.7 |
| GG | 55.8 | 68.0 | 181.3 |
| HH | 71.7 | 85.3 | 223.8 |
| II | 72.0 | 86.0 | 227.6 |
| JJ | 71.2 | 85.9 | 233.2 |
| KK | 70.3 | 88.2 | 235.4 |
| LL | 70.1 | 85.8 | 215.1 |
| MM | 70.3 | 85.1 | 218.5 |
| NN | 69.8 | 85.4 | 220.3 |
| OO | 71.3 | 86.3 | 220.0 |
| PP | 70.8 | 89.3 | 223.4 |
| QQ | 70.2 | 88.2 | 238.3 |

The numerical values are expressed in mg based on 100 g of chicken meat or chicken fat.

TABLE 20

K Value of Chicken Meat after 10 Days of Storage

| Group | Breast Meat | Leg Meat |
|---|---|---|
| AA | 32.1 | 34.9 |
| BB | 30.3 | 29.6 |
| CC | 25.1 | 22.9 |
| DD | 22.2 | 21.2 |
| EE | 19.8 | 20.3 |
| FF | 36.7 | 38.1 |
| GG | 34.8 | 36.5 |
| HH | 55.1 | 56.0 |
| II | 55.3 | 55.4 |
| JJ | 55.2 | 54.7 |
| KK | 54.9 | 56.3 |
| LL | 54.5 | 56.1 |
| MM | 55.2 | 55.9 |
| NN | 54.9 | 54.3 |
| OO | 55.0 | 55.7 |
| PP | 55.3 | 54.7 |
| QQ | 55.1 | 55.8 |

TABLE 21

Change in TBA Value after 10 Days Storage

| Group | Breast Meat | Leg Meat | Chicken Fat |
|---|---|---|---|
| AA | 0.35 | 0.34 | 0.30 |
| BB | 0.30 | 0.29 | 0.26 |
| CC | 0.22 | 0.20 | 0.21 |
| DD | 0.19 | 0.17 | 0.18 |
| EE | 0.15 | 0.15 | 0.14 |
| FF | 0.37 | 0.38 | 0.36 |
| GG | 0.38 | 0.38 | 0.36 |
| HH | 0.42 | 0.41 | 0.41 |
| II | 0.44 | 0.40 | 0.42 |
| JJ | 0.40 | 0.43 | 0.43 |
| KK | 0.43 | 0.41 | 0.41 |
| LL | 0.41 | 0.44 | 0.42 |
| MM | 0.44 | 0.42 | 0.41 |
| NN | 0.46 | 0.42 | 0.40 |
| OO | 0.43 | 0.40 | 0.45 |
| PP | 0.44 | 0.42 | 0.43 |
| QQ | 0.45 | 0.40 | 0.45 |

TABLE 22

Change in POV Value after 10 Days Storage

| Group | Breast Meat | Leg Meat | Chicken Fat |
|---|---|---|---|
| AA | 0.85 | 0.88 | 1.12 |
| BB | 0.73 | 0.77 | 0.99 |
| CC | 0.62 | 0.59 | 0.88 |
| DD | 0.57 | 0.52 | 0.78 |
| EE | 0.53 | 0.48 | 0.71 |
| FF | 1.03 | 1.09 | 1.37 |
| GG | 0.92 | 0.97 | 1.28 |
| HH | 1.55 | 1.52 | 1.78 |
| II | 1.52 | 1.53 | 1.80 |
| JJ | 1.52 | 1.56 | 1.75 |
| KK | 1.48 | 1.50 | 1.79 |
| LL | 1.50 | 1.48 | 1.77 |
| MM | 1.49 | 1.50 | 1.76 |
| NN | 1.55 | 1.52 | 1.75 |
| OO | 1.48 | 1.54 | 1.77 |
| PP | 1.49 | 1.55 | 1.81 |
| QQ | 1.50 | 1.53 | 1.80 |

Test Example 4

White Leghorn laying hens at 121 days of age were housed in poultry houses of the windowless vertical 6-shelf cage type. A test was carried out for deterinming the effect of the producibility improver of the present invention on the period of addition. A supplying feed was obtained by adding the polygalactomannan obtained in Example 1 so as to be at 0.025% by weight and the polyphenol compound obtained in Example 2 so as to be at 0.02% by weight to a commercially available formula feed for laying hens.

Four poultry houses AAA to DDD (30,000 hens/poultry house) were set: the group fed with the above-mentioned supplying feed for 4 months from the time of housing the laying hens in the poultry house was assigned Poultry House AAA; the group fed for 8 months was assigned Poultry House BBB; the group fed for 12 months was assigned Poultry House CCC; and the group fed for 3 months was assigned Poultry House DDD. Also, the laying hens were allowed to take water ad libitum. After the termination of each period, the laying hens in each poultry house were fed with a commercially available formula feed for laying hens.

As indices for producibility, there were determined a liveability, a rate of egg production, each egg weight, a weight of eggs produced per day, a total number of eggs produced and a total weight of produced eggs at 4, 8 and 12 months after the laying hens were housed in the poultry houses. The results are shown in Tables 23 to 28.

It is shown in Tables 23 to 28 that excellent results were obtained for the poultry houses (AAA to CCC) in which the producibility improver of the present invention was given for 4 months or more.

Furthermore, after 1 year of breeding the laying hens from the time of housing them in the poultry houses, 20 eggs each were collected from each poultry house. Haugh unit and vitamin E content were determined on the day of collection for 10 of the eggs, and after 2 weeks of storage at 4° C. for the remaining 10 eggs, respectively. The results are shown in Tables 29 and 30.

As shown in Tables 29 and 30, excellent results were obtained for the poultry houses (AAA to CCC) in which the producibility improver of the present invention was given for 4 months or more.

It is suggested from these results that the longer the period of addition of the producibility improver of the present invention is, the more enhanced are suppressive effects of decreases in the liveability and the rate of egg production; effects of increasing each egg weight, the weight of eggs produced per day, the number of eggs produced and the weight of produced eggs; and suppressive effect of a decrease in the Haugh unit and suppressive effect of a decrease in the vitamin E content during egg storage.

TABLE 23

Liveability

| Poultry House | 4M (%) | 8M (%) | 12M (%) |
|---|---|---|---|
| AAA | 99.40 | 98.00 | 96.00 |
| BBB | 99.41 | 98.83 | 96.88 |
| CCC | 99.42 | 98.82 | 97.48 |
| DDD | 98.88 | 97.80 | 94.88 |

TABLE 24

Rate of Egg Production

| Poultry House | 4M (%) | 8M (%) | 12M (%) |
|---|---|---|---|
| AAA | 94.1 | 85.4 | 74.9 |
| BBB | 94.2 | 86.1 | 75.2 |
| CCC | 94.2 | 86.3 | 75.8 |
| DDD | 92.0 | 82.5 | 73.0 |

TABLE 25

Each Egg Weight

| Poultry House | 4M (g) | 8M (g) | 12M (g) |
|---|---|---|---|
| AAA | 61.3 | 63.9 | 64.9 |
| BBB | 61.1 | 64.2 | 65.6 |
| CCC | 61.2 | 64.2 | 66.2 |
| DDD | 58.2 | 60.5 | 60.9 |

TABLE 26

Weight of Eggs Produced Per Day

| Poultry House | 4M (g) | 8M (g) | 12M (g) |
|---|---|---|---|
| AAA | 57.70 | 56.20 | 48.90 |
| BBB | 57.63 | 57.00 | 49.66 |
| CCC | 57.74 | 57.03 | 52.59 |
| DDD | 53.88 | 53.69 | 46.22 |

TABLE 27

Number of Eggs Produced

| Poultry House | 4M (ct) | 8M (ct) | 12M (ct) |
|---|---|---|---|
| AAA | 350,158 | 777,983 | 1,084,314 |
| BBB | 350,144 | 778,870 | 1,091,321 |
| CCC | 350,152 | 778,862 | 1,103,764 |
| DDD | 295,028 | 714,022 | 1,002,333 |

Numerical values are expressed in count.

TABLE 28

Weight of Produced Eggs

| Poultry House | 4M (kg) | 8M (kg) | 12M (kg) |
|---|---|---|---|
| AAA | 21,464.7 | 49,713.1 | 70,372.0 |
| BBB | 21,393.8 | 50,003.5 | 71,590.7 |
| CCC | 21,429.3 | 50,002.9 | 73,069.2 |
| DDD | 17,170.6 | 43,198.3 | 61,042.1 |

Numerical values are expressed in kg.

TABLE 29

Change in Haugh Unit

| Poultry House | Immediately After Egg Production | After 2 Weeks of Storage |
|---|---|---|
| AAA | 96.7 | 84.1 |
| BBB | 97.1 | 86.0 |
| CCC | 96.0 | 89.2 |
| DDD | 97.0 | 78.9 |

The numerical values are a mean value for 5 eggs.

TABLE 30

Change in Vitamin E Content

| Poultry House | Immediately After Egg Production | After 2 Weeks of Storage |
|---|---|---|
| AAA | 3.2 | 2.1 |
| BBB | 3.0 | 2.3 |
| CCC | 3.1 | 2.8 |
| DDD | 3.2 | 1.7 |

The numerical values are expressed in mg based on 100 g of egg yolk solution.

Test Example 5

White Leghorn laying hens at 121 days of age were housed in poultry houses of the windowless vertical 6-shelf cage type. A test was carred out for deterimining the effect of the producibility improver of the present invention on the period of addition. A supplying feed was obtained by adding the producibility improvers obtained in Example 7 so as to be at 0.25% by weight to a commercially available formula feed for laying hens.

Four poultry houses EEE to HHH (30,000 hens/poultry house) were set: the group fed with the above-mentioned supplying feed for 4 months from the time of housing the laying hens in the poultry house was assigned Poultry House EEE; the group fed for 8 months was assigned Poultry House FFF; the group fed Ad for 12 months was assigned Poultry House GGG; and the group fed for 3 months was assigned Poultry House HHH. Also, the laying hens were allowed to take water ad libitum. After the termination of each period, the laying hens in each poultry house were fed with a commercially available formula feed for laying hens.

As indices for producibility, there were determined a liveability, a rate of egg production, each egg weight, a weight of eggs produced per day, a total number of eggs produced and a total weight of produced eggs at 4, 8 and 12 months after the laying hens were housed in the poultry houses. The results are shown in Tables 31 to 36.

It is shown in Tables 31 to 36 that excellent results were obtained for the poultry houses (EEE to GGG) in which the producibility improver of the present invention was given for 4 months or more.

Furthermore, after 1 year of breeding the laying hens from the time of housing them in the poultry houses, 20 eggs each were collected from each poultry house. Haugh unit and vitamin E content were determined on the day of collection for 10 of the eggs, and after 2 weeks of storage at 4° C. for the remaining 10 eggs, respectively. The results are respectively shown in Tables 37 and 38.

As shown in Tables 37 and 38, excellent results were obtained for the poultry houses (EEE to GGG) in which the producibility improver of the present invention was given for 4 months or more.

It is suggested from these results that the longer the period of addition of the producibility improver of the present invention is, the more enhanced are suppressive effects of decreases in the liveability and the rate of egg production; effects of increasing each egg weight, the weight of eggs produced per day, the number of eggs produced and the weight of produced eggs; and suppressive. tol effect of a decrease in the Haugh unit and suppressive effect of a decrease in the vitamin E content during egg storage.

TABLE 31

Liveability

| Poultry House | 4M (%) | 8M (%) | 12M (%) |
|---|---|---|---|
| EEE | 99.63 | 98.88 | 97.11 |
| FFF | 99.59 | 99.08 | 97.88 |
| GGG | 99.61 | 99.10 | 98.11 |
| HHH | 98.77 | 97.62 | 94.21 |

TABLE 32

Rate of Egg Production

| Poultry House | 4M (%) | 8M (%) | 12M (%) |
|---|---|---|---|
| EEE | 96.3 | 87.9 | 76.0 |
| FFF | 95.9 | 88.2 | 76.8 |
| GGG | 96.1 | 88.0 | 77.3 |
| HHH | 91.9 | 82.0 | 70.0 |

TABLE 33

Each Egg Weight

| Poultry House | 4M (g) | 8M (g) | 12M (g) |
|---|---|---|---|
| EEE | 63.0 | 64.5 | 65.0 |
| FFF | 62.8 | 65.8 | 66.3 |
| GGG | 62.9 | 65.6 | 67.3 |
| HHH | 61.6 | 62.1 | 62.3 |

TABLE 34

Weight of Eggs Produced Per Day

| Poultry House | 4M (g) | 8M (g) | 12M (g) |
|---|---|---|---|
| EEE | 59.48 | 56.00 | 47.88 |
| FFF | 59.60 | 56.69 | 48.32 |
| GGG | 59.59 | 56.67 | 49.10 |
| HHH | 53.81 | 50.92 | 47.22 |

TABLE 35

Number of Eggs Produced

| Poultry House | 4M (ct) | 8M (ct) | 12M (ct) |
|---|---|---|---|
| EEE | 361,646 | 789,311 | 1,101,231 |
| FFF | 361,521 | 791,923 | 1,133,464 |
| GGG | 361,321 | 791,811 | 1,188,212 |
| HHH | 295,702 | 714,762 | 1,014,951 |

TABLE 36

Weight of Produced Eggs

| Poultry House | 4M (kg) | 8M (kg) | 12M (kg) |
|---|---|---|---|
| EEE | 22,783.7 | 50,910.6 | 71,580.0 |
| FFF | 22,703.5 | 52,108.5 | 75,148.7 |
| GGG | 22,727.1 | 51,942.8 | 79,966.7 |
| HHH | 18,215.2 | 44,386.7 | 63,231.4 |

TABLE 37

Change in Haugh Unit

| Poultry House | Immediately After Egg Production | After 2 Weeks of Storage |
|---|---|---|
| EEE | 98.1 | 90.8 |
| FFF | 98.0 | 92.0 |
| GGG | 98.3 | 93.0 |
| HHH | 98.1 | 79.0 |

The numerical values are a mean value for 5 eggs.

TABLE 38

Change in Vitamin E Content

| Poultry House | Immediately After Egg Production | After 2 Weeks of Storage |
|---|---|---|
| EEE | 3.2 | 2.3 |
| FFF | 3.1 | 2.6 |
| GGG | 3.2 | 2.9 |
| HHH | 3.1 | 1.8 |

The numerical values are expressed in mg based on 100 g of egg yolk solution.

Test Example 6

White Leghorn laying hens at 121 days of age were housed in poultry houses of the windowless vertical 6-shelf cage type. A test was carried out for determining the effect of the producibility improver of the present invention on timing of addition. A supplying feed was obtained by adding the polygalactomannan obtained in Example 1 so as to be at 0.025% by weight and the polyphenol compound obtained in Example 2 so as to be at 0.02% by weight to a commercially available formula feed for laying hens.

Three poultry houses mII to KKK (30,000 hens/poultry house) were set: the group fed with the above-mentioned supplying feed for 4 months from the time of housing the laying hens in the poultry house was assigned Poultry House m; the group fed for 4 months after 4 months of housing the laying hens in the poultry house was assigned Poultry House JJJ; and the group fed for 4 months after 8 months of housing the laying hens in the poultry house was assigned Poultry House KKK. Also, the laying hens were allowed to take water ad libitum. After the groups were fed with the above-mentioned supplying feed for 4 months, the laying hens in each poultry house were fed with a commercially available formula feed for laying hens.

As indices for producibility, there were determined a liveability, a rate of egg production, each egg weight, a weight of eggs produced per day, a total number of eggs produced and a total weight of produced eggs at 4, 8 and 12 months after the laying hens were housed in the poultry houses. The results are shown in Tables 39 to 44.

As shown in Tables 39 to 44, more excellent results were obtained for the poultry house III in which the producibility improver of the present invention was given from the time of housing the laying hens in the poultry house, as compared with the other poultry houses.

Furthermore, after 1 year of breeding the laying hens from the time of housing them in the poultry houses, 20 eggs each were collected from each poultry house. Haugh unit and vitamin E content were determined on the day of collection for 10 of the eggs, and after 2 weeks of storage at 4° C. for the remaining 10 eggs, respectively. The results are respectively shown in Tables 45 and 46.

As shown in Tables 45 and 46, more excellent results were obtained for the poultry house m in which the producibility improver of the present invention was given from the time of housing the laying hens in the poultry house, as compared with the other poultry houses.

It is suggested from these results that when the producibility improver of the present invention is added from the time of housing the laying hens in the poultry house, there are obtained suppressive effects of decreases in the liveability and the rate of egg production; effects of increasing each egg weight, the weight of eggs produced per day, the number of eggs produced and the weight of produced eggs; and the suppressive effect of a decrease in the Haugh unit and suppressive effect of a decrease in the vitamin E content during egg storage.

TABLE 39

Liveability

| Poultry House | 4M (%) | 8M (%) | 12M (%) |
|---|---|---|---|
| III | 99.40 | 98.00 | 96.00 |
| JJJ | 98.79 | 97.22 | 94.44 |
| KKK | 98.80 | 97.83 | 94.81 |

TABLE 40

Rate of Egg Production

| Poultry House | 4M (%) | 8M (%) | 12M (%) |
|---|---|---|---|
| III | 94.1 | 85.4 | 77.9 |
| JJJ | 91.2 | 81.1 | 73.0 |
| KKK | 91.8 | 82.1 | 73.2 |

TABLE 41

Each Egg Weight

| Poultry House | 4M (g) | 8M (g) | 12M (g) |
|---|---|---|---|
| III | 61.3 | 63.9 | 64.9 |
| JJJ | 57.8 | 60.8 | 61.5 |
| KKK | 58.1 | 61.0 | 62.0 |

TABLE 41-continued

Each Egg Weight

| Poultry House | 4M (g) | 8M (g) | 12M (g) |
|---|---|---|---|

Numerical values are expressed in g.

TABLE 42

Weight of Eggs Produced Per Day

| Poultry House | 4M (g) | 8M (g) | 12M (g) |
|---|---|---|---|
| III | 57.70 | 54.72 | 47.79 |
| JJJ | 53.21 | 50.98 | 47.21 |
| KKK | 53.81 | 51.00 | 47.48 |

TABLE 43

Number of Eggs Produced

| Poultry House | 4M (ct) | 8M (ct) | 12M (ct) |
|---|---|---|---|
| III | 350,158 | 777,983 | 1,084,314 |
| JJJ | 294,952 | 713,942 | 1,018,488 |
| KKK | 295,283 | 714,202 | 1,019,991 |

TABLE 44

Weight of Produced Eggs

| Poultry House | 4M (kg) | 8M (kg) | 12M (kg) |
|---|---|---|---|
| III | 21,464.7 | 49,713.1 | 70,372.0 |
| JJJ | 17,048.2 | 43,407.7 | 62,637.0 |
| KKK | 17,155.9 | 43,566.3 | 63,239.4 |

TABLE 45

Change Haugh Unit

| Poultry House | Immediately After Egg Production | After 2 Weeks of Storage |
|---|---|---|
| III | 96.7 | 84.1 |
| JJJ | 96.8 | 76.7 |
| KKK | 96.3 | 77.3 |

The numerical values are a mean value for 5 eggs.

TABLE 46

Change in Vitamin E Content

| Poultry House | Immediately After Egg Production | After 2 Weeks of Storage |
|---|---|---|
| III | 3.2 | 2.1 |
| JJJ | 3.3 | 1.4 |
| KKK | 3.2 | 1.5 |

The numerical values are expressed in mg based on 100 g of egg yolk solution.

Test Example 7

White Leghorn laying hens at 121 days of age were housed in poultry houses of the windowless vertical 6-shelf cage type. A test was carried out for determining the effect of the producibility improver of the present invention on timing of addition. A supplying feed was obtained by adding the producibility improver obtained in Example 7 so as to be at 0.25% by weight to a commercially available formula feed for laying hens.

Three poultry houses LLL to NNN (30,000 hens/poultry house) were set: the group fed with the above-mentioned supplying feed for 4 months from the time of housing the laying hens in the poultry house was assigned Poultry House LLL; the group fed for 4 months after 4 months of housing the laying hens in the poultry house was assigned Poultry House MMM; and the group fed for 4 months after 8 months of housing the laying hens in the poultry house was assigned Poultry House NNN. Also, the laying hens were allowed to take water ad libitum. After the groups were fed for 4 months as mentioned above, the laying hens in each poultry house were fed with a commercially available formula feed for laying hens.

As indices for producibility, there were determined a liveability, a rate of egg production, each egg weight, a weight of eggs produced per day, a total number of eggs produced and a total weight of produced eggs at 4, 8 and 12 months after the laying hens were housed in the poultry houses. The results are shown in Tables 47 to 52.

As shown in Tables 47 to 52, excellent results were obtained for the poultry house LLL in which the producibility improver of the present invention was given from the time of housing the laying hens in the poultry house, as compared with the other poultry houses.

Furthermore, after 1 year of breeding the laying hens from the time of housing them in the poultry houses, 20 eggs each were collected from each poultry house. Haugh unit and vitamin E content were determined on the day of collection for 10 of the eggs, and after 2 weeks of storage at 4° C. for the remaining 10 eggs, respectively. The change in Haugh unit is shown in Table 53, and the change in the vitamin E content is shown in Table 54.

As shown in Tables 53 and 54, more excellent results were obtained for the poultry house LLL in which the producibility improver of the present invention was given from the time of housing the laying hens in the poultry house, as compared with the other poultry houses.

It is suggested from these results that when the producibility improver of the present invention is added from the time of housing the laying hens in the poultry house, there are obtained suppressive effects of decreases in the liveability and the rate of egg production; effects of increasing each egg weight, the weight of eggs produced per day, the number of eggs produced and the weight of produced eggs; and suppressive effect of a decrease in the Haugh unit and suppressive effect of a decrease in the vitamin E content during egg storage.

TABLE 47

Liveability

| Poultry House | 4M (%) | 8M (%) | 12M (%) |
|---|---|---|---|
| LLL | 99.63 | 98.88 | 97.11 |
| MMM | 98.10 | 96.99 | 94.00 |
| NNN | 98.21 | 97.22 | 94.19 |

TABLE 48

Rate of Egg Production

| Poultry House | 4M (%) | 8M (%) | 12M (%) |
|---|---|---|---|
| LLL | 96.3 | 87.9 | 78.5 |
| MMM | 91.9 | 82.0 | 71.7 |
| NNN | 92.2 | 81.7 | 72.0 |

TABLE 49

Each Egg Weight

| Poultry House | 4M (g) | 8M (g) | 12M (g) |
|---|---|---|---|
| LLL | 63.0 | 64.5 | 65.0 |
| MMM | 59.9 | 61.1 | 62.0 |
| NNN | 59.8 | 61.0 | 62.4 |

TABLE 50

Weight of Eggs Produced Per Day

| Poultry House | 4M (g) | 8M (g) | 12M (g) |
|---|---|---|---|
| LLL | 59.48 | 56.00 | 49.88 |
| MMM | 52.10 | 48.22 | 46.21 |
| NNN | 53.81 | 48.92 | 46.22 |

TABLE 51

Number of Eggs Produced

| Poultry House | 4M (ct) | 8M (ct) | 12M (ct) |
|---|---|---|---|
| LLL | 361,646 | 789,311 | 1,101,231 |
| MMM | 295,512 | 714,569 | 1,015,095 |
| NNN | 295,651 | 714,698 | 1,015,352 |

TABLE 52

Weight of Produced Eggs

| Poultry House | 4M (kg) | 8M (kg) | 12M (kg) |
|---|---|---|---|
| LLL | 22,783.7 | 50,910.6 | 71,580.0 |
| MMM | 17,701.2 | 43,660.2 | 62,935.9 |
| NNN | 17,679.9 | 43,596.6 | 63,358.0 |

TABLE 53

Change in Haugh Unit

| Poultry House | Immediately After Egg Production | After 2 Weeks of Storage |
|---|---|---|
| LLL | 98.1 | 90.8 |
| MMM | 98.4 | 78.0 |
| NNN | 98.1 | 78.9 |

The numerical values are a mean value for 5 eggs.

TABLE 54

Change in Vitamin E Content

| Poultry House | Immediately After Egg Production | After 2 Weeks of Storage |
|---|---|---|
| LLL | 3.2 | 2.3 |
| MMM | 3.3 | 1.6 |
| NNN | 3.1 | 1.6 |

The numerical values are expressed in mg based on 100 g of egg yolk solution.

Test Example 8

Isabrown laying hens were housed in poultry houses of the windowless vertical 2-shelf cage type, and a field test concerning suppression of a decrease in a highly unsaturated fatty acid content during egg storage and effects of a period of addition of the producibility improver of the present invention on vitamin E content and Haugh unit was carried out.

A supplying feed was obtained by adding 0.025% by weight of the polygalactomannan obtained in Example 1 and 0.02% by weight of the polyphenol compound obtained in Example 2 to a formula feed, (a feed prepared by adding 2 kg of a fish oil and 10 g of vitamin E to 100 kg of a commercially available feed for chicken raising).

Ah Four poultry houses aaa to ddd (10,000 hens/poultry house) were set: the group fed with the above-mentioned supplying feed for 4 months from the time of housing the laying hens in the poultry house was assigned Poultry House ana; the group fed for 8 months was assigned Poultry House bbb; the group fed for 12 months was assigned Poultry House ccc; and the group fed for 3 months was assigned Poultry House ddd. Also, the laying hens were allowed to take water ad libitum. After the termination of each period, the laying hens in each poultry house were fed with the above-mentioned formula feed (a feed prepared by adding 2 kg of a fish oil and 10 g of vitamin E to 100 kg of a commercially available feed for chicken raising).

After 1 year of breeding the laying hens from the time of housing them in the poultry houses, 20 eggs each were collected from each poultry house. DHA content and EPA content of the eggs, as indices for a highly unsaturated fatty acid, were determined on the day of collection for 10 of the eggs, and after 2 weeks of storage at 4° C. for the remaining 10 eggs, respectively. In addition, vitamin E content and Haugh unit were determined in the same manner. The results are shown in Tables 55 to 58.

As shown in Tables 55 to 58, excellent results were obtained for the poultry houses (aaa to ccc), the groups of which were fed for 4 months or more.

It is suggested from these results that the longer the period of addition of the producibility improver of the present invention is, the more enhanced are suppressive effects of decreases in the DHA content and the EPA content, i.e., the highly unsatrrated fatty acid content during egg storage; suppressive effect of a decrease in the vitamin E content; and suppressive effect of a decrease in the Haugh unit.

TABLE 55

Change in DHA Content

| Poultry House | Immediately After Egg Production | After 2 Weeks of Storage |
|---|---|---|
| aaa | 1,494.8 | 1,485.2 |
| bbb | 1,495.0 | 1,487.3 |
| ccc | 1,494.2 | 1,489.2 |
| ddd | 1,494.5 | 1,345.0 |

The numerical values are expressed in mg based on 100 g of egg yolk solution.

TABLE 56

Change in EPA Content

| Poultry House | Immediately After Egg Production | After 2 Weeks of Storage |
|---|---|---|
| aaa | 104.2 | 96.1 |
| bbb | 103.9 | 98.2 |
| ccc | 104.0 | 100.2 |
| ddd | 104.0 | 83.2 |

The numerical values are expressed in mg based on 100 g of egg yolk solution.

TABLE 57

Change in Vitamin E Content

| Poultry House | Immediately After Egg Production | After 2 Weeks of Storage |
|---|---|---|
| aaa | 3.0 | 2.2 |
| bbb | 3.0 | 2.4 |
| ccc | 3.2 | 2.6 |
| ddd | 3.1 | 1.4 |

The numerical values are expressed in mg based on 100 g of egg yolk solution.

TABLE 58

Change in Haugh Unit

| Poultry House | Immediately After Egg Production | After 2 Weeks of Storage |
|---|---|---|
| aaa | 96.1 | 86.9 |
| bbb | 96.0 | 88.3 |
| ccc | 96.1 | 90.2 |
| ddd | 96.2 | 78.5 |

The numerical values are a mean value for 5 eggs.

Test Example 9

Isabrown laying hens were housed in poultry houses of the windowless vertical 2-shelf cage type, and a field test concerning effect of a period of addition of the producibility improver of the present invention on suppression of a decrease in a highly unsaturated fatty acid content during storage of eggs laid by laying hens was carried out.

A supplying feed was obtained by adding the producibility improver obtained in Example 7 so as to be at 0.25% by weight to a formula feed for laying hens (a feed prepared by adding 2 kg of a fish oil and 10 g of vitamin E to 100 kg of a commercially available feed for chicken raising).

Four poultry houses eee to hhh (10,000 hens/poultry house) were set: the group fed with the above-mentioned supplying feed for 4 months from the time of housing the laying hens in the poultry house was assigned Poultry House eee; the group fed for 8 months was assigned Poultry House fff the group fed for 12 months was assigned Poultry House ggg; and the group fed for 3 months was assigned Poultry House hhh. Also, the laying hens were allowed to take water ad libitum. After the termination of each period, the laying hens in each poultry house were fed with the above-mentioned formula feed (a feed prepared by adding 2 kg of a fish oil and 10 g of vitamin E to 100 kg of a commercially available feed for chicken raising).

After 1 year of breeding the laying hens, 20 eggs each were collected from each poultry house. DHA content and EPA content of the eggs, as indices for a highly unsaturated fatty acid, were determined on the day of collection for 10 of the eggs, and after 2 weeks of storage at 4° C. for the remaining 10 eggs, respectively. In addition, vitamin E content and Haugh unit were determined in the same manner. The results are respectively shown in Tables 59 to 62.

As shown in Tables 59 to 62, excellent results were obtained for the poultry houses (eee to ggg), the groups of which were fed for 4 months or more.

It is suggested from these results that the longer the period of addition of the producibility improver of the present invention is, the more enhanced are suppressive effects of decreases in the DHA content and the EPA content, i.e., the highly unsaturated fatty acid content during egg storage; suppressive effect of a decrease in the vitamin E content; and suppressive effect of a decrease in the Haugh unit.

TABLE 59

Change in DHA Content

| Poultry House | Immediately After Egg Production | After 2 Weeks of Storage |
| --- | --- | --- |
| eee | 1,493.9 | 1,487.4 |
| fff | 1,494.0 | 1,489.2 |
| ggg | 1,493.3 | 1,491.5 |
| hhh | 1,494.0 | 1,345.3 |

The numerical values are expressed in mg based on 100 g of egg yolk solution.

TABLE 60

Change in EPA Content

| Poultry House | Immediately After Egg Production | After 2 Weeks of Storage |
| --- | --- | --- |
| eee | 104.2 | 99.3 |
| fff | 104.0 | 101.2 |
| ggg | 104.3 | 103.0 |
| hhh | 103.9 | 83.0 |

The numerical values are expressed in mg based on 100 g of egg yolk solution.

TABLE 61

Change in Vitamin E Content

| Poultry House | Immediately After Egg Production | After 2 Weeks of Storage |
| --- | --- | --- |
| eee | 3.0 | 2.6 |
| fff | 3.0 | 2.8 |
| ggg | 3.1 | 3.0 |
| hhh | 3.3 | 1.2 |

TABLE 61-continued

Change in Vitamin E Content

| Poultry House | Immediately After Egg Production | After 2 Weeks of Storage |
| --- | --- | --- |

The numerical values are expressed in mg based on 100 g of egg yolk solution.

TABLE 62

Change in Haugh Unit

| Poultry House | Immediately After Egg Production | After 2 Weeks of Storage |
| --- | --- | --- |
| eee | 96.3 | 90.3 |
| fff | 96.2 | 92.1 |
| ggg | 96.5 | 94.5 |
| hhh | 96.4 | 78.0 |

The numerical values are a mean value for 5 eggs.

Test Example 10

Isabrown laying hens were housed in poultry houses of the windowless vertical 2-shelf cage type, and a field test concerning effect of timing of addition of the producibility improver of the present invention on suppression of a decrease in a highly unsaturated fatty acid content during storage of eggs laid by laying hens was carried out.

A supplying feed was obtained by adding the polygalactomannan obtained in Example 1 so as to be at 0.025% by weight and the polyphenol compound obtained in Example 2 so as to be at 0.02% by weight to a formula feed (a feed prepared by adding 2 kg of a fish oil and 10 g of vitamin E to 100 kg of a commercially available feed for chicken raising).

Three poultry houses iii to kkk (10,000 hens/poultry house) were set: the group fed with the above-mentioned supplying feed for 4 months from the time of housing the laying hens in the poultry house was assigned Poultry House iii; the group fed for 4 months after 4 months of housing the laying hens in the poultry house was assigned Poultry House jjj; and the group fed for 4 months after 8 months of housing the laying hens in the poultry house was assigned Poultry House kkk. Also, the laying hens were allowed to take water ad libitum. After the termination of each period, the laying hens in each poultry house were fed with the above-mentioned formula feed (a feed prepared by adding 2 kg of a fish oil and 10 g of vitamin E to 100 kg of a commercially available feed for chicken raising).

After 4 months of giving a feed in which the producibility improver of the present invention was added, 20 eggs each were collected from each poultry house. DHA content and EPA content of the eggs, as indices for a highly unsaturated fatty acid, were determined on the day of collection for 10 of the eggs, and after 2 weeks of storage at 4° C. for the remaining 10 eggs, respectively. In addition, vitamin E content and Haugh unit were determined in the same manner. The results are shown in Tables 63 to 66.

As shown in Tables 63 and 64, excellent results were obtained for the poultry house iii in which the producibility improver of the present invention was given from the time of housing the laying hens in the poultry house, as compared with the other poultry houses.

It is suggested from these results that when the producibility improver of the present invention is added from the time of housing the laying hens in the poultry house, there are obtained suppressive effects of respective decreases in Inf the DHA content, the EPA content and the vitamin E content; and suppressive effect of a decrease in the Haugh unit.

TABLE 63

Change in DHA Content

| Poultry House | Immediately After Egg Production | After 2 Weeks of Storage |
| --- | --- | --- |
| iii | 1,494.2 | 1,489.2 |
| jjj | 1,494.1 | 1,343.4 |
| kkk | 1,494.3 | 1,344.1 |

The numerical values are expressed in mg based on 100 g of egg yolk solution.

TABLE 64

Change in EPA Content

| Poultry House | Immediately After Egg Production | After 2 Weeks of Storage |
| --- | --- | --- |
| iii | 104.0 | 100.2 |
| jjj | 103.0 | 82.1 |
| kkk | 104.3 | 83.5 |

The numerical values are expressed in mg based on 100 g of egg yolk solution.

TABLE 65

Change in Vitamin E Content

| Poultry House | Immediately After Egg Production | After 2 Weeks of Storage |
| --- | --- | --- |
| iii | 3.2 | 2.6 |
| jjj | 3.1 | 1.4 |
| kkk | 3.0 | 1.2 |

The numerical values are expressed in mg based on 100 g of egg yolk solution.

TABLE 66

Change in Haugh Unit

| Poultry House | Immediately After Egg Production | After 2 Weeks of Storage |
| --- | --- | --- |
| iii | 96.1 | 90.2 |
| jjj | 96.3 | 78.4 |
| kkk | 96.0 | 78.0 |

The numerical values are a mean value for 5 eggs.

Test Example 11

Isabrown laying hens were housed in poultry houses of the windowless vertical 2-shelf cage type, and a field test concerning effect of timing of addition of the producibility improver of the present invention on suppression of a decrease in a highly unsaturated fatty acid content during storage of eggs laid by laying hens was carried out.

A supplying feed was obtained by adding 0.25% of the producibility improver obtained in Example 7 to a formula feed for laying hens (a feed prepared by adding 2 kg of a fish oil and 10 g of vitamin E to 100 kg of a commercially available feed for chicken raising).

Three poultry houses lll to nnn (10,000 hens/poultry house) were set: the group fed with the above-mentioned supplying feed for 4 months from the time of housing the laying hens in the poultry house was assigned Poultry House lll; the group fed for 4 months after 4 months of housing the laying hens in the poultry house was assigned Poultry House mmm; and the group fed for 4 months after 8 months of housing the laying hens in the poultry house was assigned Poultry House nnn. Also, the laying hens were allowed to take water ad libitum. After the termination of each period, the laying hens in each poultry house were fed with the above-mentioned formula feed (a feed prepared by adding 2 kg of a fish oil and 10 g of vitamin E to 100 kg of a commercially available feed for chicken raising).

After 4 months from the time of adding the producibility improver of the present invention to the feed, 20 eggs each were collected from each poultry house. DHA content and EPA content of the eggs, as indices for a highly unsaturated fatty acid, were determined on the day of collection for 10 of the eggs, and after 2 weeks of storage at 4° C. for the remaining 10 eggs, respectively. In addition, vitamin E content and Haugh unit were determined in the same manner. The results are shown in Tables 67 to 70.

As shown in Tables 67 to 70, excellent results were obtained for the poultry house lll in which the producibility improver of the present invention was given from the time of housing the laying hens in the poultry house, as compared with the other poultry houses.

It is suggested from these results that when the producibility improver of to the present invention is added from the time of housing the laying hens in the poultry house, there are obtained suppressive effects of respective decreases in the DHA content, the EPA content and the vitamin E content; and suppressive effect of a decrease in the Haugh unit.

TABLE 67

Change in DHA Content

| Poultry House | Immediately After Egg Production | After 2 Weeks of Storage |
| --- | --- | --- |
| lll | 1,493.9 | 1,487.4 |
| mmm | 1,493.2 | 1,344.0 |
| nnn | 1,493.8 | 1,345.4 |

The numerical values are expressed in mg based on 100 g of egg yolk solution.

TABLE 68

Change in EPA Content

| Poultry House | Immediately After Egg Production | After 2 Weeks of Storage |
| --- | --- | --- |
| lll | 104.2 | 99.3 |
| mmm | 104.0 | 82.1 |
| nnn | 103.6 | 83.0 |

The numerical values are expressed in mg based on 100 g of egg yolk solution.

TABLE 69

Change in Vitamin E Content

| Poultry House | Immediately After Egg Production | After 2 Weeks of Storage |
| --- | --- | --- |
| lll | 3.0 | 2.6 |
| mmm | 3.0 | 1.1 |
| nnn | 3.2 | 1.4 |

The numerical values are expressed in mg based on 100 g of egg yolk solution.

TABLE 70

Change in Haugh Unit

| Poultry House | Immediately After Egg Production | After 2 Weeks of Storage |
| --- | --- | --- |
| lll | 96.3 | 90.3 |
| mmm | 96.1 | 77.3 |
| nnn | 96.2 | 78.3 |

The numerical values are a mean value for 5 eggs.

Test Example 12

White Cornish edible chickens were bred for 8 weeks from newly-hatched chickens and marketed. The hatched chickens were divided into 4 groups, AAAA to DDDD at 200 chickens per group, and a field test concerning the effect on the period of addition of the producibility improver of the present invention was carried out. A supplying feed was obtained by adding the polygalactomnannan obtained in Example 1 so as to be 0.025% by weight and the polyphenol compound obtained in Example 2 so as to be 0.02% by weight to a commercially available formula feed for edible chickens.

The period of addition was from 2 weeks before marketing to the time of marketing for group AAAA, from 4 weeks before marketing to the time of marketing for group BBBB, from 8 weeks before marketing to the time of marketing for group CCCC, and from 1 week before marketing to the time of marketing for group DDDD. Also, the chickens were allowed to take feed and water ad libitum.

The number of edible chickens and the body weight at the time of marketing were determined to obtain the liveability and weekly body weight gain. The results are shown in Tables 71 and 72.

Furthermore, at the time of marketing, 5 edible chickens were slaughtered from each group, 50 g each of breast meat, leg meat and chicken fat were cut out at 2 pieces per chicken, and the cholesterol contents were determined. In addition, at the time of marketing, 5 chickens were selected from each group, 50 g each of breast meat and leg meat were cut out at 2 pieces per chicken, and K values of the breast meat and the leg meat were determined on the day they were cut out and after 10 days of storage at 4° C., using a kit for determining K value manufactured by Daiichi Pharmaceutical Co., Ltd. Furthermore, at the time of marketing, 5 chickens were selected from each group, 50 g each of breast meat, leg meat and chicken fat were cut out at 2 pieces per chicken, and change in TBA value and in POV value of the breast meat, the leg meat and the chicken fat were also determined on the day they were cut out and after 10 days of storage at 4° C. The results are shown in Tables 73 to 76.

As shown in Tables 71 to 76, excellent results were obtained for the poultry houses (AAAA to CCCC) in which the producibility improver of the present invention was given 2 weeks or more before marketing.

It is suggested from these results that when the producibility improver of the present invention is added 8 weeks before marketing, a suppressive effect of Ad ridecrease in liveability, an effect of increase in weekly body weight gain, an effect of decrease in cholesterol content, and a suppressive effect of increase in K value, and suppressive effects of increases in ThA value and in POV value are obtained.

TABLE 71

Liveability

| Group | % |
| --- | --- |
| AAAA | 97.01 |
| BBBB | 97.55 |
| CCCC | 98.02 |
| DDDD | 94.50 |

TABLE 72

Weekly Body Weight Gain

| Group | g |
| --- | --- |
| AAAA | 469.2 |
| BBBB | 470.3 |
| CCCC | 472.3 |
| DDDD | 452.3 |

Numerical values were obtained by the expression of [(Body weight after 8 weeks of breeding) − (Body weight at initiation of breeding)]/8.

TABLE 73

Cholesterol Content

| Group | Breast Meat | Leg Meat | Chicken Fat |
| --- | --- | --- | --- |
| AAAA | 53.1 | 70.5 | 176.9 |
| BBBB | 52.4 | 69.8 | 174.3 |
| CCCC | 51.1 | 68.2 | 172.1 |
| DDDD | 73.0 | 88.0 | 239.8 |

The numerical values are expressed in mg based on 100 g of chicken meat or chicken fat.

TABLE 74

K Value of Chicken Meat after 10 Days of Storage

| Group | Breast Meat | Leg Meat |
| --- | --- | --- |
| AAAA | 32.5 | 32.4 |
| BBBB | 31.2 | 30.4 |
| CCCC | 30.3 | 29.6 |
| DDDD | 55.0 | 56.4 |

TABLE 75

Change in TBA Value after 10 Days Storage

| Group | Breast Meat | Leg Meat | Chicken Fat |
| --- | --- | --- | --- |
| AAAA | 0.35 | 0.33 | 0.30 |
| BBBB | 0.32 | 0.31 | 0.28 |
| CCCC | 0.30 | 0.29 | 0.26 |
| DDDD | 0.47 | 0.42 | 0.47 |

TABLE 76

Change in POV Value after 10 Days Storage

| Group | Breast Meat | Leg Meat | Chicken Fat |
| --- | --- | --- | --- |
| AAAA | 0.78 | 0.80 | 1.12 |
| BBBB | 0.75 | 0.79 | 1.04 |
| CCCC | 0.73 | 0.77 | 0.99 |
| DDDD | 1.52 | 1.56 | 1.86 |

Test Exampe 13

White Cornish edible chickens were bred for 8 weeks from newly-hatched chickens and marketed. The hatched chickens were divided into 4 groups, EEEE to HHHH at 200 chickens per group, and a field test concerning the effect on the period of addition of the producibility improver of the present invention was carried out. A supplying feed was obtained by adding the producibility improver obtained in Example 7 so as to be at 0.25% by weight to a commercially available formula feed for edible chickens.

The period of addition was from 2 weeks before marketing to the time of marketing for group EEEE, from 4 weeks before marketing to the time of marketing for group FFFF, from 8 weeks before marketing to the time of marketing for group GGGG, and from 1 week before marketing to the time of marketing for group HHHH. Also, the chickens were allowed to take feed and water ad libitum. After the termination of each period, the chickens in each poultry house were fed with a commercially available formula feed for edible chickens.

The number of edible chickens and the body weight at the time of marketing were determined to obtain the liveability and weekly body weight gain The results are shown in Tables 77 and 78.

Furthermore, at the time of marketing, 5 edible chickens were slaughtered from each group, 50 g each of breast meat, leg meat and chicken fat were cut out at 2 pieces per chicken, and the cholesterol contents were determined. In addition, at the time of marketing, 5 chickens were selected from each group, 50 g each of breast meat and leg meat were cut out at 2 pieces per chicken, and K values of the breast meat and the leg meat were determined on the day they were cut out and after 10 days of storage at 4° C., using a kit for determining K value manufactured by Daiichi Pharmaceutical Co., Ltd. Furthermore, at the time of marketing, 5 chickens were selected from each group, 50 g each of breast meat, leg meat and chicken fat were cut out at 2 pieces per chicken, and change in TBA value and in POV value of the breast meat, the leg meat and the chicken fat were also determined on the day they were cut out and after 10 days of storage at 4° C. The results are shown in Tables 79 to 82.

As shown in Tables 77 to 82, excellent results were obtained for the poultry houses (EEE to GGGG) in which the producibility improver of the present invention was given 2 weeks or more before marketing.

It is suggested from these results that when the producibility improver of the present invention is added from 8 weeks before marketing to the time of marketing, a suppressive effect of decrease in liveability, an effect of increase in weekly body weight gain, an effect of decrease in cholesterol content, and a suppressive effect of increase in K value, and suppressive effects of increases in TBA value and in POV value are obtained.

TABLE 77

Liveability

| Group | % |
| --- | --- |
| EEEE | 98.02 |
| FFFF | 98.64 |
| GGGG | 98.92 |
| HHHH | 94.32 |

TABLE 78

Weekly Body Weight Gain

| Group | % |
| --- | --- |
| EEEE | 479.1 |
| FFFF | 480.5 |
| GGGG | 482.3 |
| HHHH | 451.7 |

Numerical values were obtained by the expression of [(Body weight after 8 weeks of breeding) − (Body weight at initiation of breeding)]/8.

TABLE 79

Cholesterol Content

| Group | Breast Meat | Leg Meat | Chicken Fat |
| --- | --- | --- | --- |
| EEEE | 51.2 | 62.4 | 164.2 |
| FFFF | 50.4 | 61.2 | 163.6 |
| GGGG | 49.5 | 60.3 | 162.7 |
| HHHH | 73.3 | 88.4 | 240.3 |

The numerical values are expressed in mg based on 100 g of chicken meat or chicken fat.

TABLE 80

K Value of Chicken Meat after 10 Days of Storage

| Group | Breast Meat | Leg Meat |
| --- | --- | --- |
| EEEE | 23.5 | 23.1 |
| FFFF | 23.0 | 22.5 |
| GGGG | 22.2 | 21.2 |
| HHHH | 55.4 | 56.7 |

TABLE 81

Change in TBA Value after 10 Days Storage

| Group | Breast Meat | Leg Meat | Chicken Fat |
| --- | --- | --- | --- |
| EEEE | 0.22 | 0.20 | 0.21 |
| FFFF | 0.20 | 0.19 | 0.19 |
| GGGG | 0.19 | 0.17 | 0.18 |
| HHHH | 0.49 | 0.47 | 0.51 |

TABLE 82

Change in POV Value after 10 Days Storage

| Group | Breast Meat | Leg Meat | Chicken Fat |
| --- | --- | --- | --- |
| EEEE | 0.60 | 0.55 | 0.80 |
| FFFF | 0.58 | 0.53 | 0.79 |
| GGGG | 0.57 | 0.52 | 0.78 |
| HHHH | 1.55 | 1.59 | 1.90 |

Test Example 14

White Cornish edible chickens were bred for 8 weeks from newly-hatched chickens and marketed. The hatched chickens were divided into 3 groups, IIII to KKKK at 200 chickens per group, and a field test concerning timing of addition of the producibility improver of the present invention was carried out. A supplying feed was obtained by adding 0.025% of the polygalactomannan obtained in Example 1 and 0.02% of the polyphenol compound obtained in Example 2 to a commercially available formula feed for edible chickens.

The timing of addition was a period of 2 weeks, from 2 weeks before marketing to the time of marketing for group HU11; a period of 2 weeks, from 4 weeks before marketing for group JJJJ; and a period of 2 weeks, from 8 weeks before marketing for group KKKK. Also, the chickens were allowed to take feed and water ad libitum. After the termination of each period, the chickensin each poultry house were fed with a commercially available formula feed for edible chickens.

The number of edible chickens and the body weight at the time of marketing were determined to obtain the liveability and weekly body weight gain. The results are shown in Tables 83 and 84.

Furthermore, at the time of marketing, 5 edible chickens were slaughtered from each group, 50 g each of breast meat, leg meat and chicken fat were cut out at 2 pieces per chicken, and the cholesterol contents were determined. In addition, at the time of marketing, 5 chickens were selected from each group, 50 g each of breast meat and leg meat were cut out at 2 pieces per chicken, and K values of the breast meat and the leg meat were determined on the day they were cut out and after 10 days of storage at 4° C., using a kit for determining K value manufactured by Daichi Pharmaceutical Co., Ltd. Furthermore, at the time of marketing, 5 chickens were selected from each group, 50 g each of breast meat, leg meat and chicken fat were cut out at 2 pieces per chicken, and change in TBA value and in POV value of the breast meat, the leg meat and the chicken fat were also determined on the day they were cut out and after 10 days of storage at 4° C. The results are shown in Tables 85 to 88.

As shown in Tables 83 to 88, more excellent results were obtained for the group IIII in which the producibility improver of the present invention was given for 2 weeks from 2 weeks before marketing to the time of marketing.

It is suggested from these results that when the timing of adding the producibility improver of the present invention is 2 weeks before marketing, a suppressive effect of decrease in liveability, an effect of increase in weekly body weight gain, an effect of decrease in cholesterol content, and a suppressive effect of increase in K value, and suppressive effects of increases in TBA value and in POV value are furter obtained.

TABLE 83

Liveability

| Group | % |
|---|---|
| IIII | 97.01 |
| JJJJ | 94.80 |
| KKKK | 94.32 |

TABLE 84

Weekly Body Weight Gain

| Group | g |
|---|---|
| IIII | 469.2 |
| JJJJ | 453.1 |
| KKKK | 452.8 |

Numerical values were obtained by the expression of [(Body weight after 8 weeks of breeding) − (Body weight at initiation of breeding)]/8.

TABLE 85

Cholesterol Content

| Group | Breast Meat | Leg Meat | Chicken Fat |
|---|---|---|---|
| IIII | 53.1 | 70.5 | 176.9 |
| JJJJ | 73.1 | 87.4 | 241.2 |
| KKKK | 73.4 | 88.1 | 239.6 |

The numerical values are expressed in mg based on 100 g of chicken meat or chicken fat.

TABLE 86

K Value of Chicken Meat after 10 Days of Storage

| Group | Breast Meat | Leg Meat |
|---|---|---|
| IIII | 32.5 | 32.4 |
| JJJJ | 54.5 | 56.0 |
| KKKK | 54.9 | 56.2 |

TABLE 87

Change in TBA Value after 10 Days Storage

| Group | Breast Meat | Leg Meat | Chicken Fat |
|---|---|---|---|
| IIII | 0.35 | 0.33 | 0.30 |
| JJJJ | 0.48 | 0.40 | 0.42 |
| KKKK | 0.47 | 0.41 | 0.46 |

TABLE 88

Change in POV Value after 10 Days Storage

| Group | Breast Meat | Leg Meat | Chicken Fat |
|---|---|---|---|
| IIII | 0.78 | 0.80 | 1.12 |
| JJJJ | 1.52 | 1.60 | 1.89 |
| KKKK | 1.51 | 1.59 | 1.88 |

Test Example 15

White Cornish edible chickens were bred for 8 weeks from newly-hatched chickens and marketed. The hatched chickens were divided into 3 groups, LLLL to NNNN at 200 chickens per group, and a field test concerning the effect of the producibility improver of the present invention on timing of addition was carried out. A supplying feed was obtained by adding the producibility improver obtained in Example 7 so as to be at 0.25% by weight to a commercially available formula feed for edible chickens.

The timing of addition was a period of 2 weeks, from 2 weeks before marketing to the time of marketing for group LLLL; a period of 2 weeks, from 4 weeks before marketing for group MMMM; and a period of 2 weeks, from 8 weeks before marketing for group NNNN. Also, the chickens were allowed to take feed and water ad libitum. After the termination of each period, the chickens in each poultry house were fed with a commercially available formula feed for edible chickens.

The number of edible chickens and the body weight at the time of marketing were determined to obtain the liveability and weekly body weight gain The results are shown in Tables 89 and 90.

Furthermore, at the time of marketing, 5 edible chickens were slaughtered from each group, 50 g each of breast meat, leg meat and chicken fat were cut out at 2 pieces per chicken, and the cholesterol contents were determined. In addition, at the time of marketing, 5 chickens were selected from each group, 50 g each of breast meat and leg meat were cut out at 2 pieces per chicken, and K values of the breast meat and the leg meat were determined on the day they were cut out and after 10 days of storage at 4° C., using a Idt for determining K value manufactured by Daiichi Pharmaceutical Co., Ltd.

In addition, at the time of marketing, 5 chickens were selected from each group, 50 g each of breast meat, leg meat and chicken fat were cut out at 2 pieces per chicken, and change in TBA value and in POV value of the breast meat, the leg meat and the chicken fat were also determined on the day they were cut out and after 10 days of storage at 4° C. The results are shown in Tables 91 to 94.

As shown in Tables 89 to 94, more excellent results were obtained for the group in which the producibility improver of the present invention was given for 2 weeks ftom 2 weeks before marketing to the time of marketing.

It is suggested from these results that when the tiing of adding the producibility improver of the present invention is 8 weeks before marketing, a in suppressive effect of decrease in liveability, an effect of increase in weekly body weight gain, an effect of decrease in cholesterol content, and a suppressive effect of increase in K value, and suppressive effects of increases in TBA value and in POV value are further obtained.

TABLE 89

| Liveability | |
|---|---|
| Group | % |
| LLLL | 98.02 |
| MMMM | 94.29 |
| NNNN | 94.30 |

TABLE 90

| Weekly Body Weight Gain | |
|---|---|
| Group | g |
| LLLL | 479.1 |
| MMMM | 450.8 |
| NNNN | 451.5 |

Numerical values were obtained by the expression of [(Body weight after 8 weeks of breeding) − (Body weight at initiation of breeding)]/8.

TABLE 91

| Cholesterol Content | | | |
|---|---|---|---|
| Group | Breast Meat | Leg Meat | Chicken Fat |
| LLLL | 51.2 | 62.4 | 164.2 |
| MMMM | 72.9 | 87.9 | 239.8 |
| NNNN | 73.2 | 88.1 | 240.0 |

The numerical values are expressed in mg based on 100 g of chicken meat or chicken fat.

TABLE 92

| K Value of Chicken Meat after 10 Days of Storage | | |
|---|---|---|
| Group | Breast Meat | Leg Meat |
| LLLL | 23.5 | 23.1 |
| MMMM | 54.9 | 56.3 |
| NNNN | 55.1 | 56.3 |

TABLE 93

| Change in TBA Value after 10 Days Storage | | | |
|---|---|---|---|
| Group | Breast Meat | Leg Meat | Chicken Fat |
| LLLL | 0.22 | 0.20 | 0.21 |
| MMMM | 0.48 | 0.45 | 0.50 |
| NNNN | 0.47 | 0.46 | 0.50 |

TABLE 94

| Change in POV Value after 10 Days Storage | | | |
|---|---|---|---|
| Group | Breast Meat | Leg Meat | Chicken Fat |
| LLLL | 0.60 | 0.55 | 0.80 |
| MMMM | 1.55 | 1.54 | 1.92 |
| NNNN | 1.56 | 1.54 | 1.91 |

INDUSTRIAL APPLICABILITY

The producibility improver for poultry of the present invention has excellent characteristics that the producibility for poultry can be improved at very low costs, without making any new equipment investments, by breeding poultry by adding the producibility improver to the feed. In addition, according to the method of improving producibility for poultry using the producibility improver for poultry of the present invention, there is exhibited an excellent effect that the producibility for poultry can be improved at very low cost, without making any new equipment investments. The polymannose used in the present invention has a mannose residue. It is elucidated in *Poultry Science*, Vol. 68, 1357–1360 (1989) that a monosaccharide mannose exhibits an effect of hindering the colony formation of *Salmolella typhimurium*. From these findings, the polymannose used in the present invention having a mannose residue can be expected to have an effect of suppression in Salmolella infection for laying hens and edible chickens in addition to the effects mentioned above.

What is claimed is:
1. A productivity improver for poultry, comprising:
   (i) a polymannose having a molecular weight distribution in which a polymannose having the molecular weights ranging from $1.8 \times 10^3$ to $1.8 \times 10^5$ accounts for 70% or more, the polymannose having a viscosity of 130 cps or less at 5° C. in a 5% by weight aqueous solution as determined by Brookfield viscometer, (ii) a polyphenol compound; and (iii) a delipidated rice bran.

2. The productivity improver according to claim 1, wherein the polymannose contains a polymannose having a degree of polymerization of 30 to 40 in an amount of 25% or more.

3. The productivity improver according to claim 1, wherein the polymannose is a polygalactomannan.

4. The productivity improver according to claim 3, wherein the polygalactomannan is an enzymatically degraded product of a substance selected from the group consisting of guar gum, locust bean gum and tara gum.

5. The productivity improver according to claim 1, wherein the polyphenol compound is obtainable from a hydrothermally extracted fraction of a plant of the camellia family.

6. The productivity improver according to claim 5, wherein the plant of the camellia family is tea.

7. The productivity improver according to claim 1, wherein the polyphenol compound is obtainable from a hydrothermally extracted fraction of green tea.

8. The productivity improver according to claim 1, wherein the polyphenol compound is at least one compound selected from the group consisting of (+)-catechin, (+)-gallocatechin, (−)-gallocatechin gallate, epicatechin, (−)-epicatechin gallate, (−)-epigallocatechin, (−)-epigallocatechin gallate, free teaflavin, teaflavin monogallate A, teaflavin monogallate B, and teaflavin digallate.

9. The productivity improver according to claim 8, wherein the polyphenol compound comprises (−)-epigallocatechin gallate.

10. A method of improving productivity for hens that lay eggs or edible chicken, which comprises feeding the productivity improver of claim 1 to hens that lay eggs or to edible chicken.

11. The method of improving productivity according to claim 10, wherein the life span of hens that lay eggs is increased.

12. The method of improving productivity according to claim 10, which is for at least any one of i) increasing in each egg the weight of eggs produced by hens that lay eggs; ii) increasing in an amount of eggs produced per day; iii) increasing in number of eggs produced; iv) increasing the weight of produced eggs; and v) improving the rate of egg production for hens that lay eggs.

13. The method of improving productivity according to claim 10, wherein decrease in Haugh unit of eggs produced by hens that lay eggs is suppressed during storage.

14. The method of improving productivity according to claim 10, wherein decrease in vitamin E content of eggs produced by hens that lay eggs is suppressed during storage.

15. The method of improving productivity according to claim 10, wherein decrease in highly unsaturated fatty acid content of eggs produced by hens that lay eggs is suppressed during the storage.

16. The method of improving productivity according to claim 10, wherein decrease in content of a fatty acid selected from the group consisting of linoleic acid, arachidonic acid, α-linolenic acid, eicosapentaenoic acid, docosapentaenoic acid, DHA and EPA in eggs produced by hens that lay eggs is suppressed during the storage.

17. The method of improving productivity according to claim 15, wherein the eggs are produced from a hen that lays eggs reared with a feed which allows for an increased amount of a highly unsaturated fatty acid in the eggs.

18. The method of improving productivity according to claim 16, wherein the eggs are produced from a hen that lays eggs reared with a feed which allows for an increased amount of a fatty acid selected from the group consisting of linoleic acid, arachidonic acid, α-linolenic acid, eicosapentaenoic acid, docosapentaenoic acid, DHA and EPA in the eggs.

19. The method of improving productivity according to claim 10, wherein the life span of edible chickens is increased.

20. The method of improving productivity according to claim 10, wherein a body weight gain of edible chick/ens is improved, or a weekly body weight gain of edible chickens is improved.

21. The method of improving productivity according to claim 10, wherein freshness of chicken meat produced by edible chickens is maintained.

22. The method of improving productivity according to claim 10, which is for at least one of i) suppression of increase in K value of chicken meat of edible chickens; ii) suppression of increase in TBA value of chicken meat; and iii) suppression of increase in POV value of chicken meat.

23. The method of improving productivity according to claim 10, wherein cholesterol content of chicken meat produced by edible chickens is reduced.

24. The method of improving productivity according to any one of claims 11 to 18, which comprises supplying the productivity improver of claim 1 to hens that lay eggs for at least 4 months after the hens are housed in a poultry house.

25. The method of improving productivity according to any one of claims 19 to 23, which comprises feeding the productivity improver of claim 1 to edible chickens no later than 2 weeks before completion of rearing to the time of completion of rearing.

26. The method of improving productivity according to claim 10, which comprises feeding a mixture prepared by formulating a polymannose in an amount of 0.005 to 0.1 parts by weight and a polyphenol compound in an amount of 0.005 to 0.1 parts by weight, and optionally 0.05 to 0.5 parts by weight of delipidated rice bran thereto, based on 100 parts by weight of the mixture.

27. A method for increasing the life span of hens that lay eggs, which comprises feeding the productivity improver of claim 1 to said hens.

28. A method for increasing the weight of an egg produced by hens that lay eggs, which comprises feeding the productivity improver of claim 1 to said hens.

29. A method for increasing the number of eggs produced per day by hens that lay eggs, which comprises feeding the productivity improver of claim 1 to said hens.

30. A method for increasing the rate of egg production by hens that lay eggs, which comprises feeding the productivity improver of claim 1 to said hens.

31. A method for preventing a decrease in Haugh unit in eggs during storage of the eggs which are produced by hens that lay eggs, which comprises feeding the productivity improver of claim 1 to said hens.

32. A method for preventing a decrease of vitamin E content in eggs during storage of the eggs which are produced by hens that lay eggs, which comprises feeding the productivity improver of claim 1 to said hens.

33. A method for preventing a decrease in the content of highly unsaturated fatty acid in eggs during storage of the eggs which are produced by hens that lay eggs, which comprises feeding the productivity improver of claim 1 to said hens.

34. A method for preventing a decrease in the content of fatty acid in eggs during storage of the eggs which are produced by hens that lay eggs, the fatty acid being selected from the group consisting of linoleic acid, arachidonic acid, α-linlenic acid, eicosapentaenoic acid, docosapentaenoic acid, DHA and EPA, which comprises feeding the productivity improver of claim 1 to said hens.

35. A method for preventing a decrease in the life-span of edible chickens, which comprises feeding the productivity improver of claim 1 to edible chickens.

36. A method for improving the body weight gain of edible chickens or improving the weekly body weight gain of edible chickens, which comprises feeding the productivity improver of claim 1 to said edible chickens.

37. A method for maintaining the freshness of chicken meat produced by edible chickens, which comprises feeding the productivity improver of claim 1 to said edible chickens.

38. A method for preventing an increase in the K value of chicken meat of edible chickens, which comprises feeding the productivity improver of claim 1 to said edible chickens.

39. A method for preventing an increase in the TBA value of chicken meat of edible chickens, which comprises feeding the productivity improver of claim 1 to said edible chickens.

40. A method for preventing an increase in the POV value of chicken meat of edible chickens, which comprises feeding the productivity improver of claim 1 to said edible chickens.

41. A method for decreasing the cholesterol content of chicken meat produced by edible chickens, which comprises feeding the productivity improver of claim 1 to said edible chickens.

* * * * *

UNITED STATES PATENT AND TRADEMARK OFFICE
CERTIFICATE OF CORRECTION

PATENT NO. : 6,706,291 B1
DATED : March 16, 2004
INVENTOR(S) : Ishihara et al.

It is certified that error appears in the above-identified patent and that said Letters Patent is hereby corrected as shown below:

Title page,
Item [54], Title, change "POULTRY PRODUCIBILITY IMPROVER AND POULTRY PRODUCIBILITY IMPROVEMENT METHOD" to -- POULTRY PRODUCTIVITY IMPROVER AND METHODS FOR IMPROVING PRODUCTIVITY OF POULTRY --

Signed and Sealed this

Eighth Day of March, 2005

JON W. DUDAS
*Director of the United States Patent and Trademark Office*